May 26, 1931. H. P. ELLIOTT 1,807,309
ADDRESSING MACHINE
Filed Jan. 13, 1927  11 Sheets-Sheet 5
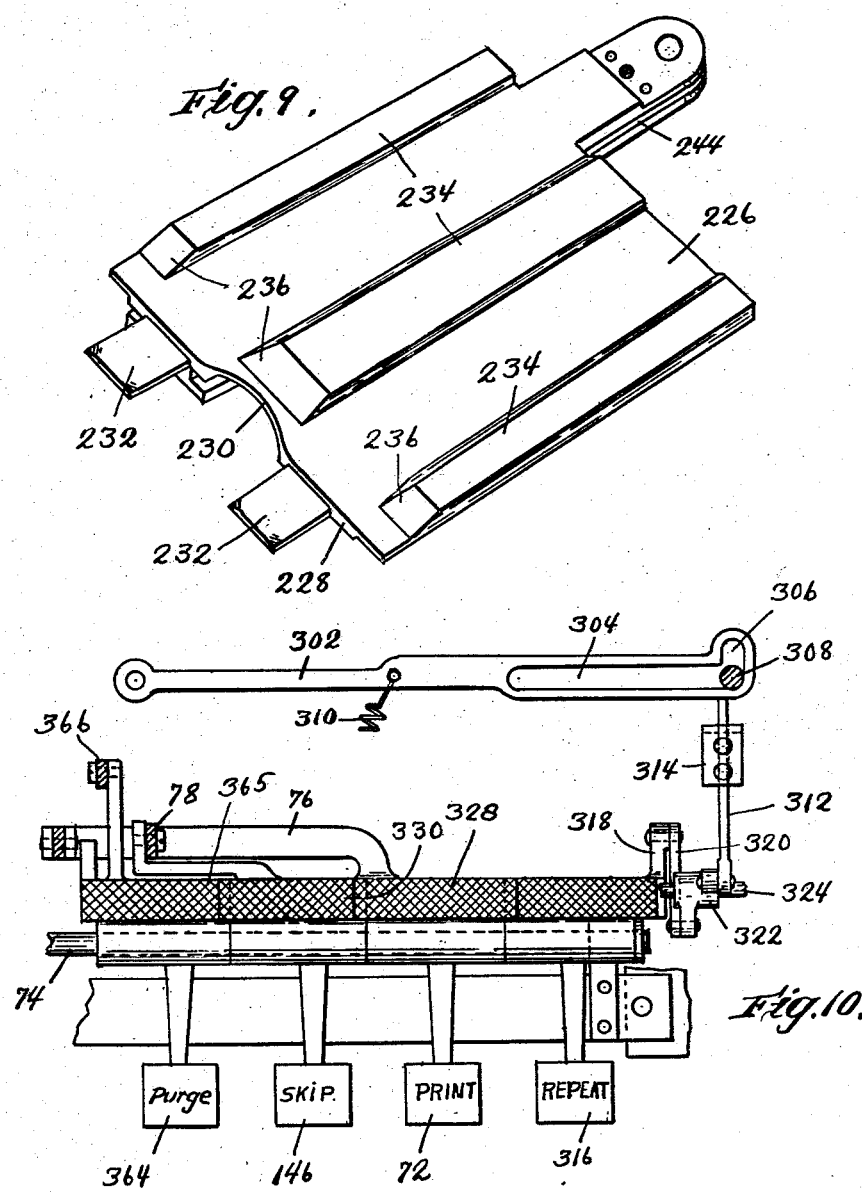

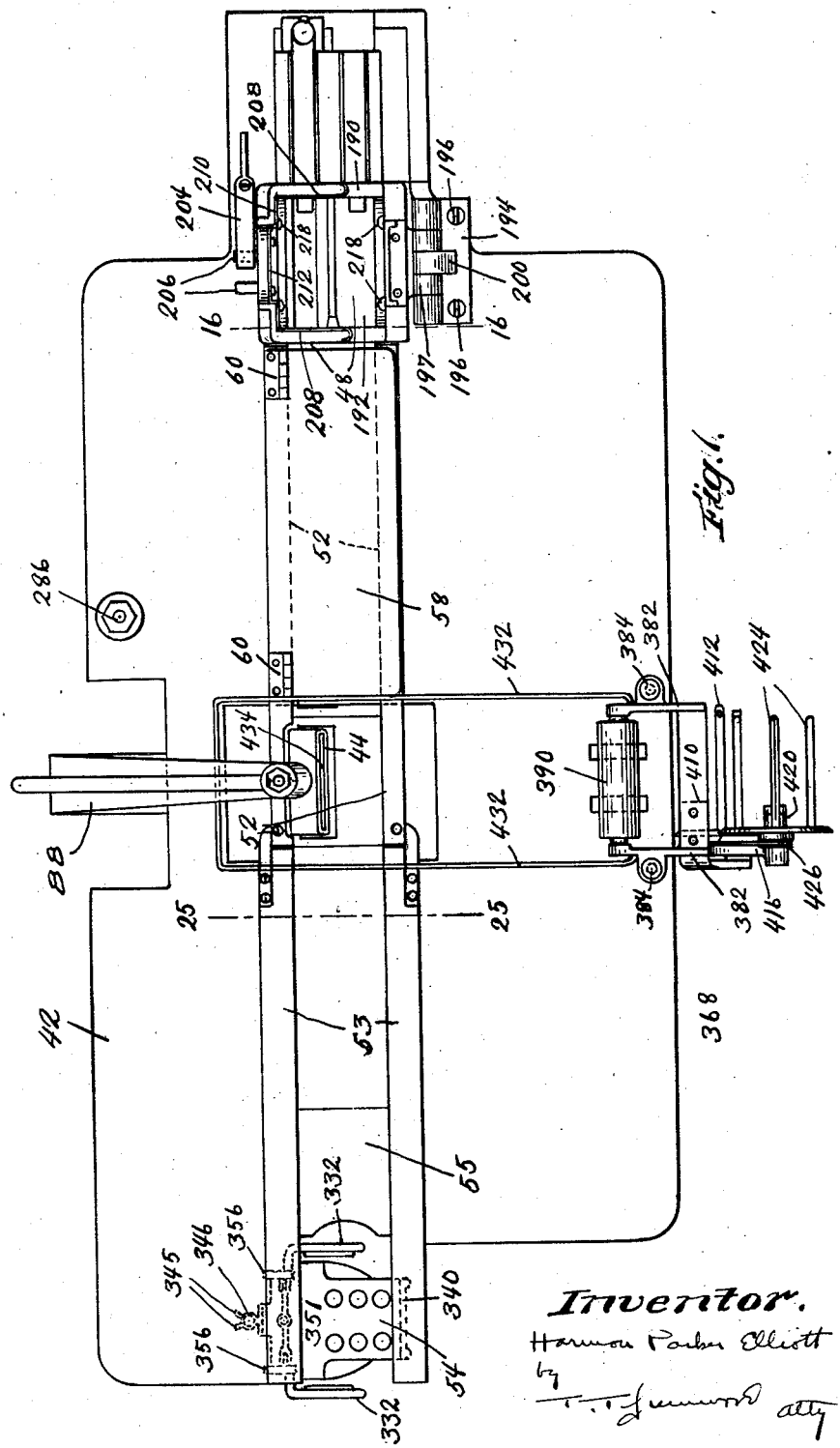

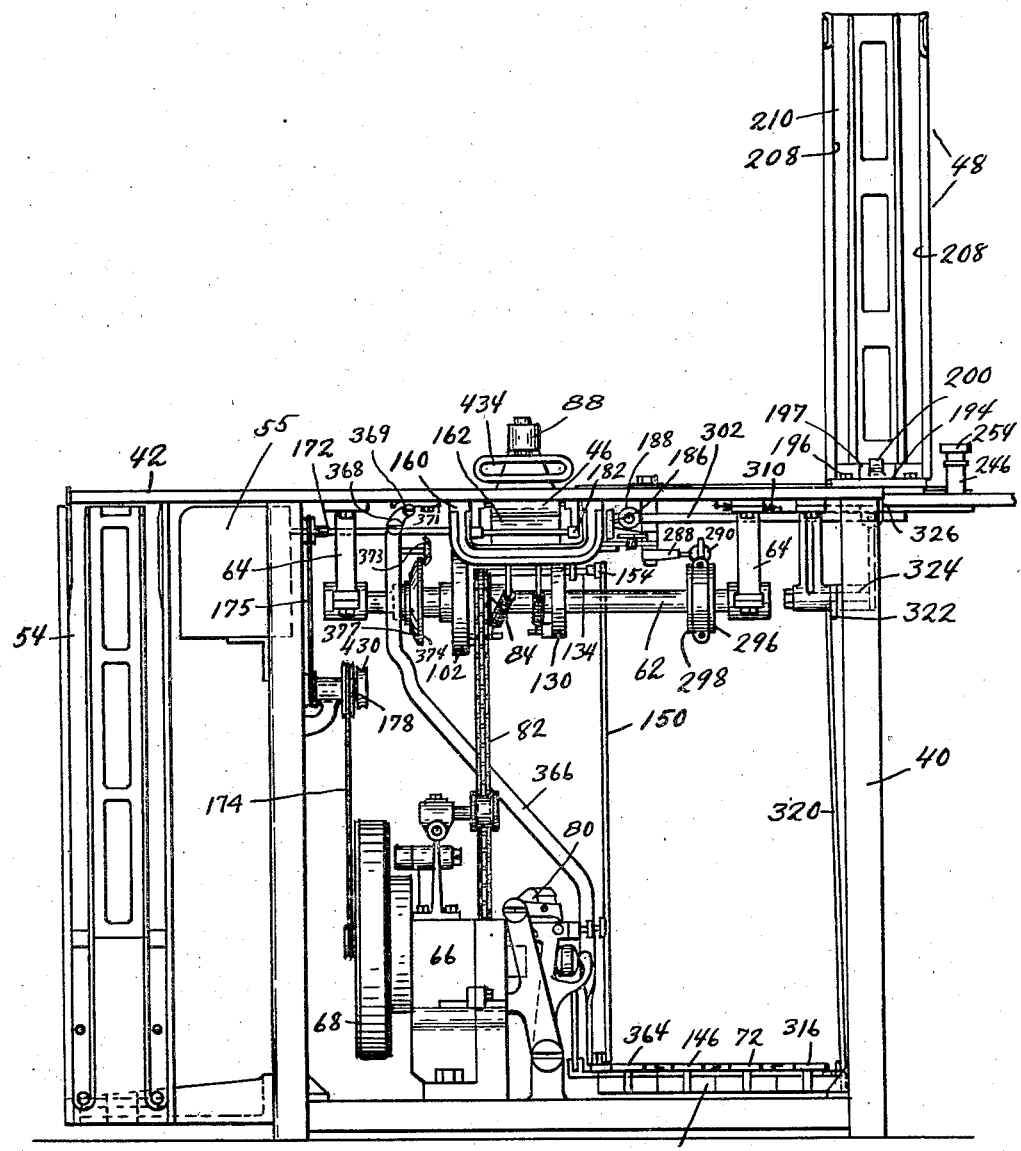

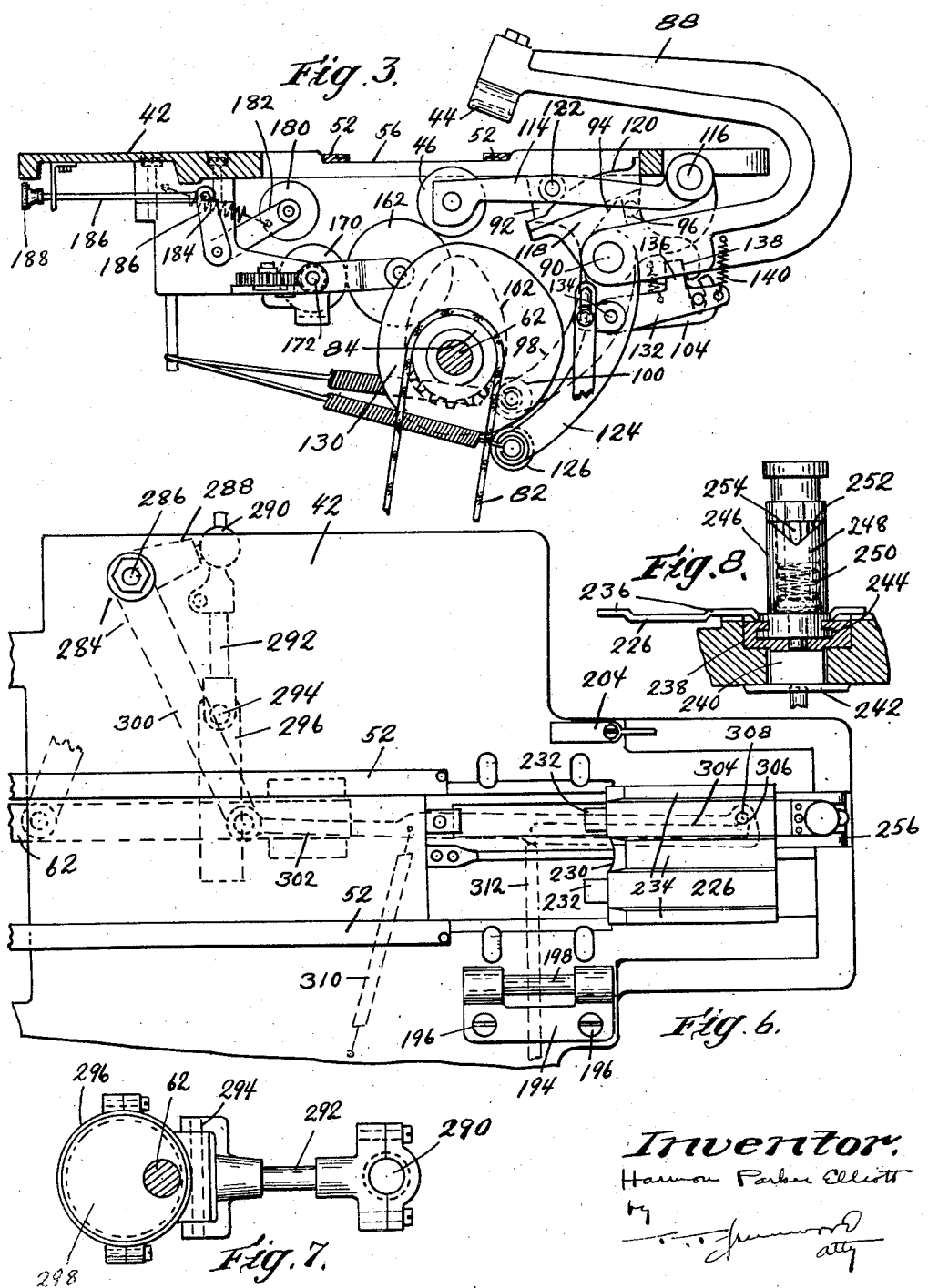

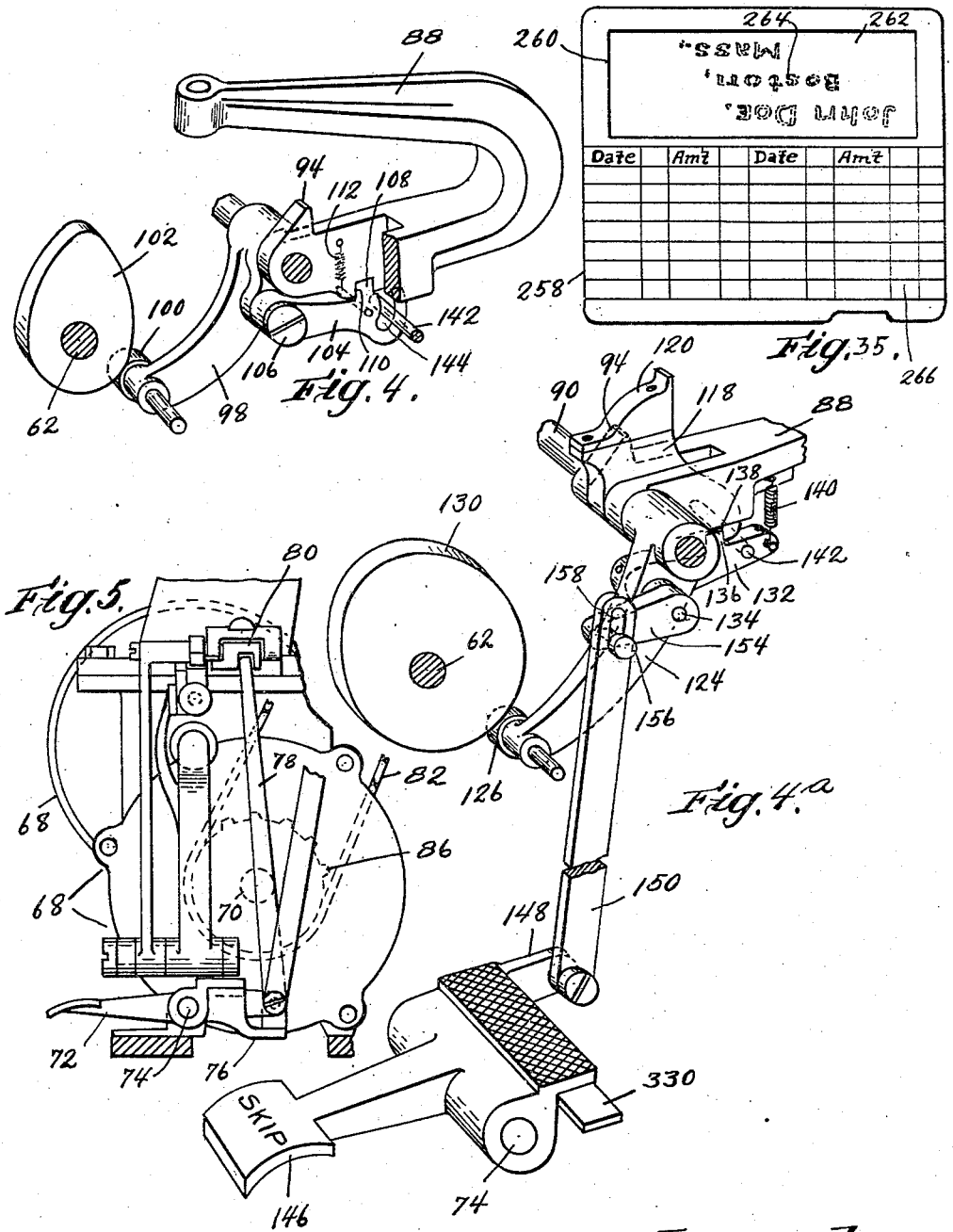

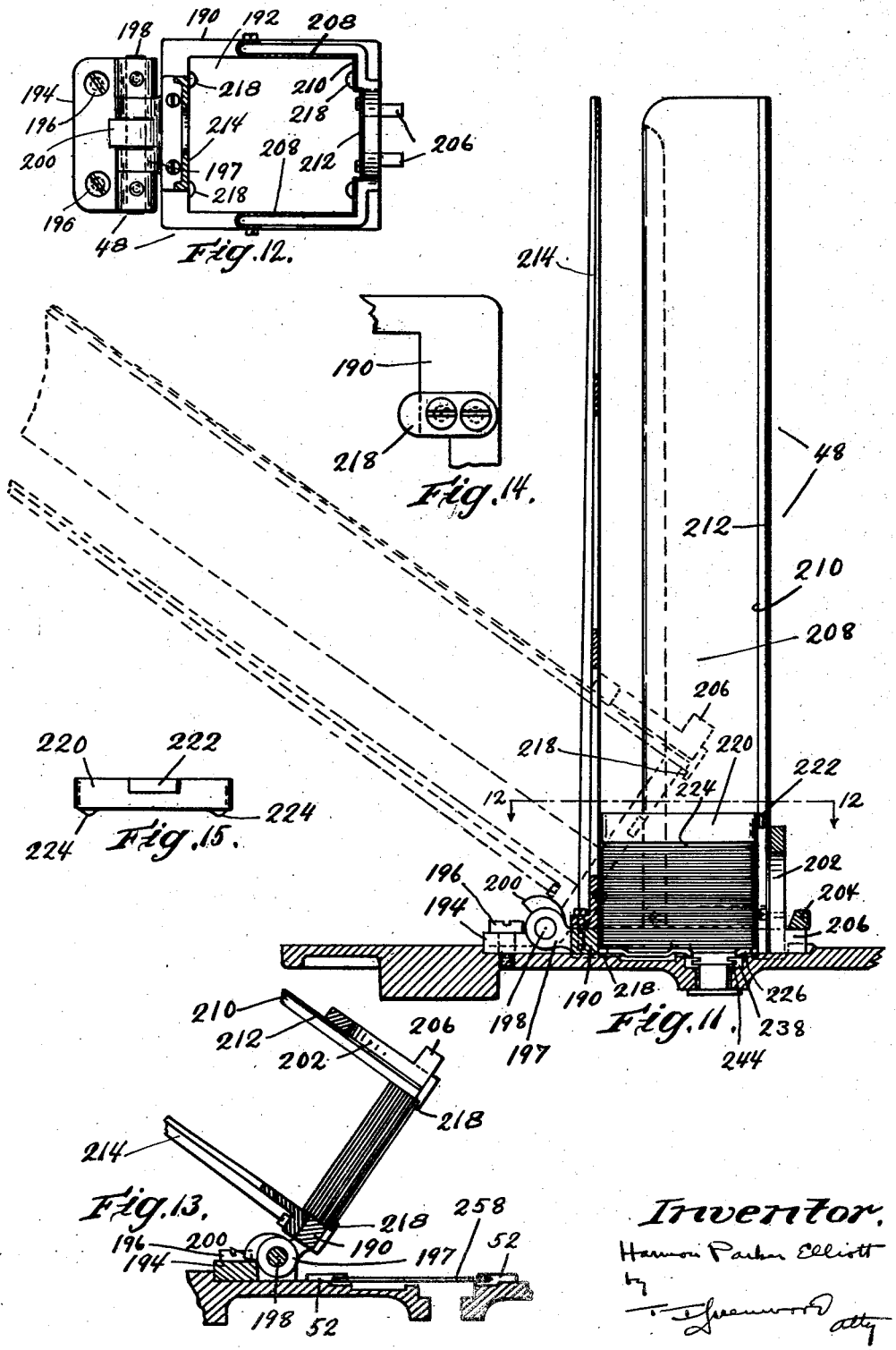

May 26, 1931.  H. P. ELLIOTT  1,807,309
ADDRESSING MACHINE
Filed Jan. 13, 1927   11 Sheets-Sheet 7
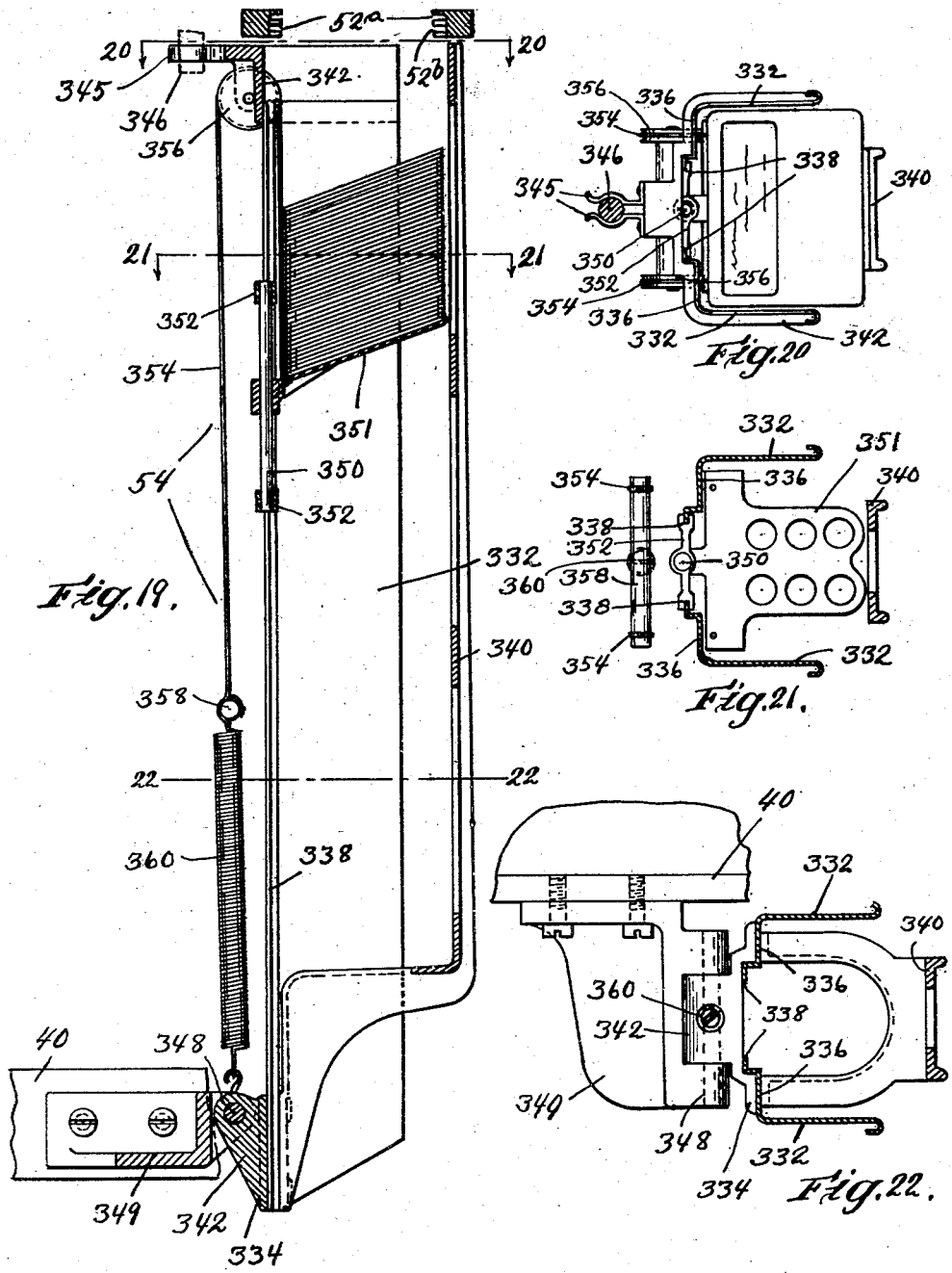
Inventor.
Harmon Parker Elliott
by _____ atty May 26, 1931. H. P. ELLIOTT 1,807,309
ADDRESSING MACHINE
Filed Jan. 13, 1927 11 Sheets-Sheet 8

Inventor,
Harmon Parker Elliott
by
F. Greenwood atty

May 26, 1931.　　　H. P. ELLIOTT　　　1,807,309
ADDRESSING MACHINE
Filed Jan. 13, 1927　　11 Sheets-Sheet 9

Inventor,
Harmon Parker Elliott
by
　　　　atty

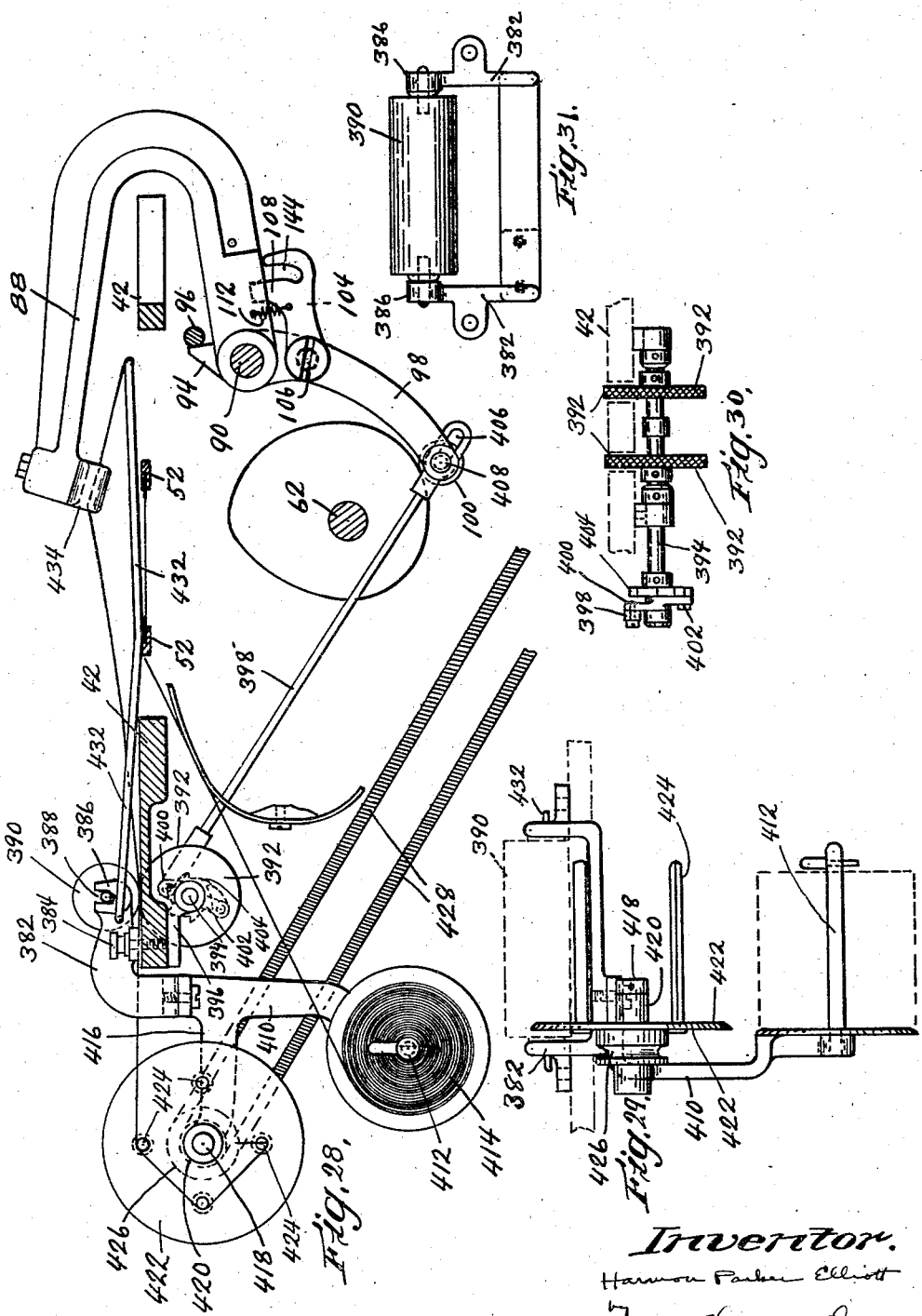

Patented May 26, 1931

1,807,309

UNITED STATES PATENT OFFICE

HARMON PARKER ELLIOTT, OF WATERTOWN, MASSACHUSETTS

ADDRESSING MACHINE

Application filed January 13, 1927. Serial No. 160,872.

This invention relates to stencil printing machines adapted for the printing of addresses on envelopes, wrappers and the like and especially for the printing of addresses for the catalogues to be sent out by mail order houses.

Mail order catalogues are relatively expensive so that they are intended to be sent only to those customers who purchase enough to warrant receiving the catalogue. The accounts of the customers are carried by the stencils, as well as the addresses, and the machine operative is instructed to send catalogues only to those customers whose recent accounts are sufficiently great to warrant receiving the catalogue and to skip those customers whose accounts do not warrant receiving a catalogue. Consequently, an object of this invention is the provision of a stencil printing or addressing machine having improved means by which the operative is enabled to print only from selected stencils and to pass other stencils through the machine without printing therefrom.

In the hurry of operating the machine, the operative sometimes finds that certain stencils are skipped or passed out of printing position without being used, the mistake ordinarily being found immediately after it has been made and while the stencil is passing out of printing position. Therefore, a further object of the invention is the provision of means which enables the operative to return an unintentionally-skipped stencil into printing position and to print therefrom.

Heretofore, it has been common practice for mail order houses periodically to inspect their lists of accounts for the purpose of removing inactive accounts or the stencils of those who have not purchased anything for so long a time or who have purchased so little as not to warrant the further sending of catalogues or other literature to them. This operation is long, tedious, and expensive. During the operation of the addressing machine, the operative has passed before her the complete list of accounts and, as has previously been stated, she is instructed to inspect each account for the purpose of determining whether or not a catalogue or other matter should be sent to the address of that account. The operative, therefore, knows at the time a stencil passes before her inspection, whether or not that account should be removed from the collection. It is, therefore, a further object of this invention to provide means under control of the operative and operable by the operative when the stencils are in printing position whereby selected stencils can be passed out of the printing position without being printed therefrom and can be removed from the collection of the stencils and discarded.

It is a further object to provide improved means to effect the repeated printing of the address of a selected stencil.

A yet further object of the invention is the provision of a stencil holder from which the stencils are moved to the printing position, which holder can be tilted for the purpose of introducing an additional supply of stencils thereinto, and for other purposes, without escape of stencils from the lower end of the holder.

Another object of the invention is the provision of a stencil receiver so constructed and arranged that the pile of stencils therein descends in the holder in proportion to the number of stencils in the pile and wherein the stencils are held free from relative movement with the side walls of the receiver during their descent therein.

In an addressing machine of the type to which this invention relates, the wrappers, envelopes and the like are placed individually in and removed from printing position by the operative. It is, therefore, a further object of the invention to provide the machine with a smooth and unobstructed table surrounding the printing position so that the operative can place a pile of wrappers, etc., upon the table in convenient position to remove the wrappers therefrom and arrange them successively in printing position. To this end, it is a further object of the invention to cover the heretofore exposed stencil track extended from the stencil holder to the printing position, the cover being hinged so that it may be removed to expose the stencil track when desired.

For the further purpose of providing an unobstructed table, it is a further object of the invention to print from below the table instead of above as has been common heretofore and, to this end, the printing roll and the inking mechanism therefor are located below the table.

It is a further object of the invention to provide a uni-directionally rotatable shaft disposed closely adjacent to and from which the various elements of the machine are operated and to rotate said shaft by a power mechanism disposed therebeneath.

The lowermost stencils are removed successively from the pile of stencils in the stencil holder by a reciprocatory pusher or shuttle. Heretofore, the operating mechanism for the pusher has been such that the stencil is given a considerable impulse at the end of the delivery stroke of the pusher with the result that the stencils do not always stop in the same position in the stencil track and in the printing position. It is a further object, therefore, to provide pusher-operating mechanism so arranged that the movement of the pusher is decelerated gradually at both ends of the stroke, and especially at the delivery end of the stroke, whereby the movement of the stencils are correspondingly decelerated gradually and each stencil can thus come to rest in the same positions in the stencil track.

The printing, skipping, and repeating mechanisms are operated by three separate pedals and it is an object of this invention to so arrange and interlock the pedals that an operative can operate any one or all of them with one foot, thereby simplifying the control of the machine and rendering it less fatiguing to the operative.

It is desirable at intervals to make what is termed a "transcript" of all the stencils for the purpose of verifying accounts and the like and, to this end, it is an object of this invention to provide means, preferably adapted as an attachment, so arranged that the addresses on the stencils can be printed on a long sheet or roll of paper which can subsequently be removed from the machine and inspected.

A further object is generally to improve the construction and operation of addressing and stencil printing machines.

Fig. 1 is a plan view of the addressing machine embodying this invention.

Fig. 2 is a front elevation of the machine.

Fig. 3 is a sectional detail taken transversely through the printing position and illustrating the operating mechanism for the platen and inking roll.

Fig. 4 is a perspective view illustrating the operating mechanism for the platen and in particular means for disabling the platen.

Fig. 4a is a perspective view of the mechanism for operating the inking roll and also the mechanism for disabling the inking roll and platen.

Fig. 5 is a fragmentary side view of the power mechanism shown in Fig. 1 and illustrating particularly the connections between the printing pedal and said mechanism.

Fig. 6 is a fragmentary plan view of the right hand section of the table and illustrating particularly the stencil pusher and the operating mechanism therefor.

Fig. 7 is a detail of the eccentric drive for the pusher-operating mechanism.

Fig. 8 is an end detail of the pusher and illustrating particularly the means for disengaging the pusher from its operating mechanism to permit the printing of the skipped stencil.

Fig. 9 is a perspective view of the stencil pusher.

Fig. 10 is a plan detail of the operating pedals and illustrating particularly the mechanism associated with the repeat pedal to permit the disabling of the pusher when it is desired to repeat the printing of the address of any selected stencil.

Fig. 11 is a detailed sectional elevation taken through the stencil holder.

Fig. 12 is a section taken along line 12—12 of Fig. 11.

Fig. 13 is a fragmentary detail illustrating the tilted position of the stencil holder and particularly the manner of retaining the pile of stencils therein.

Fig. 14 is a detail illustrating one of the tabs carried by the bottom of the stencil holder for supporting the pile of stencils therein.

Fig. 15 is a side elevation of the stencil weight looking at the right of Fig. 11 and illustrating particularly the construction of the weight to apply pressure to the stencils at their opposite sides only.

Fig. 19 is a transverse elevation taken through the stencil receiver.

Fig. 20 is a plan view of the stencil holder taken along lines 20—20 of Fig. 19.

Fig. 21 is a section taken along line 21—21 of Fig. 19, the stencils being removed.

Fig. 22 is a section along line 22—22 of Fig. 19 and illustrating more particularly the manner of pivotally supporting the receiver on the frame of the machine.

Fig. 23a is a detail of the locking-rolls of the purging mechanism in release position.

Fig. 24a is a detail of the locking-rolls in engaged or locked position.

Fig. 28 is a transverse sectional detail taken through the printing position and illustrating most particularly the transcript attachment.

Fig. 29 is a front view of the transcript attachment.

Fig. 30 is a detailed front elevation of the driving rolls for the transcript sheet.

Fig. 31 is a plan view of the press roll and its bracket disposed above the sheet-driving rolls.

Fig. 35 is a plan view of the stencil arranged for use with the addressing machine herein described.

Figure 23:
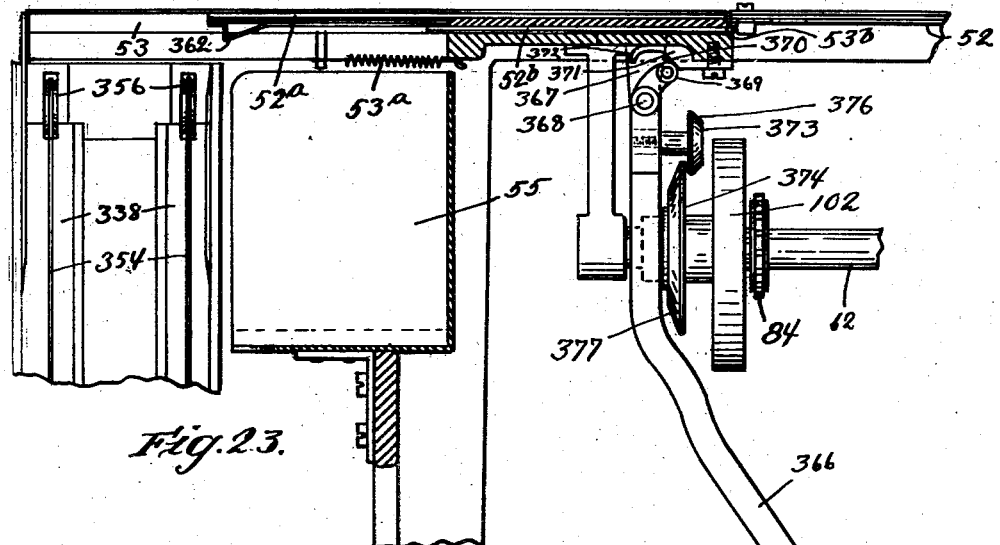
Fig. 23 is a detailed sectional elevation taken along the line of the stencil track and illustrating that portion of the stencil track extended from the printing position to the stencil receiver and the mechanism to remove or purge stencils from the collection as they pass through the machine.

The stencil printing or addressing machine embodying this invention comprises a frame 40 which supports a flat table 42, see Figs. 1 and 2. A printing plate 44 is disposed above said table in the middle thereof for movement toward and away from said table and a printing roll 46 is disposed beneath said table and platen and is movable toward and away therefrom for the printing of addresses carried by stencils supported in position between said roll and platen. The stencils to be printed from are contained in a pile in a stencil holder 48 disposed above and at the right hand side of the table, see Fig. 2. The lowermost stencils of the pile in said holder are adapted to be moved from the holder and into grooves 50 in spaced stencil rails 52 constituting a stencil track and moved along said track into printing position between said platen and roll and thence out of said printing position and into a stencil receiver 54 located below and at the left hand end of said table or else to a discarded position as will presently appear.

The stencil rails are received in a groove 56 formed in the upper face of the table, see Fig. 3, so that the upper face is free and unobstructed. That portion of said groove extended between the stencil holder and the printing position is enclosed by a cover 58 which is connected by hinges 60 to the table. Said cover is adapted normally to cover said groove and the stencil track as shown in Fig. 1 so that a pile of wrappers or envelopes and the like can be placed thereupon in convenient position to be arranged in printing position by the machine-operative. The cover, in combination with the table, thus constitutes a shelf or support for the wrappers or envelopes. The cover can be swung back to expose the stencil track and the stencils therein when desired.

The majority of the various moving elements of the machine are operated by a rotatable shaft 62 which shaft is supported in journals or brackets 64 attached to and depending beneath the table 42, see Fig. 2. Said shaft is rotated by means of power mechanism 66 of more or less well known construction supported on the frame of the machine below said shaft. Said power mechanism includes a continuously rotatable pulley 68 driven by an electric motor not shown. Said pulley is connected through a clutch mechanism not shown with a shaft 70, see Fig. 5, so that said shaft 70 can rotate continuously for so long as said clutch mechanism is engaged but is motionless when the clutch mechanism is disengaged. The power mechanism is so arranged that it effects a complete rotation of said shaft 70 for every operation of the clutch mechanism. This type of power mechanism is old in the art and need not be further described.

The clutch mechanism is actuated by a "print" pedal 72 which is loosely supported on a horizontal shaft located at the lower right hand portion of the frame 40. Said pedal has a laterally extending ear 76, see Figs. 5 and 10, to which ear a rod 78 is pivotally connected. Said rod extends upwardly to a latch 80 of the power mechanism and the arrangement is such that when the print pedal 72 is depressed and thereafter released, the clutch mechanism is actuated to effect a complete rotation of the shaft 70.

Said shaft 70 is connected with the operating shaft 62 by means of a chain 82 which is passed over a sprocket 84 fixed to said shaft 62, and a sprocket 86 fixed to the shaft 70 of the power mechanism. Said sprockets 84 and 86 are of the same pitch-diameter so that the shaft 62 is caused to make a complete revolution for one depression and release of the print pedal.

The platen or anvil 44 is reciprocated towards and away from the stencils disposed therebeneath by said operating shaft 62. To this end, said platen is secured to the end of a U-shaped arm 88 which extends over the rear edge of the table and is pivotally supported therebeneath on a shaft 90, which shaft is carried by spaced brackets 92 one of which is shown in Fig. 3. The weight of said arm is such that it is supported in its inoperative position by the engagement of a lug 94 thereof with a pin 96 carried by one of said brackets 92. A platen-operating lever 98, see Figs. 3 and 4, is pivotally supported on said shaft 90 adjacent said arm 88 and carries at its lower and free end a cam roller 100 which is adapted to be engaged by a platen-operating cam 102 fixed to the operating shaft 62. When said lever 98 is connected with said platen arm 88 it is apparent that with each rotation of the operating shaft 62 the platen will be reciprocated toward and away from a stencil disposed therebeneath.

A breakable connection is provided between said lever 98 and arm 88 so that a stencil can be skipped or passed out of printing position without being printed therefrom. Said breakable connection comprises a latch 104, see Fig. 4, which is pivoted by the screw 106 to said arm 98. Said latch is provided with a projection 108 which is adapted to enter a corresponding notch 110 of said arm 88. A spring 112 is connected with said latch and said arm 88 whereby to urge the latch in engaging position with said arm and thereby normally to lock said arm 88 and lever 98 rigidly together. Means hereinafter to be described are provided to move said latch downwardly against said spring and thereby to break the connection between said arm 88 and lever 98 whereby to permit the skipping of a stencil.

The printing roll 46 of the printing mechanism is journalled between spaced arms of a lever 114, see Fig. 3, which lever is pivoted on a shaft 116 carried by the brackets 92. Said lever is reciprocated in a vertical direction by means of a reciprocatory cam lever 118 journalled on the shaft 90. Said cam lever is provided with a cam face 120 which is adapted to engage the cam roller 122 carried by the roll-lever 114 whereby to move said printing roll into and out of engagement with a stencil disposed thereabove. Said cam lever 88 is reciprocated by means of a lever 124, see Figs. 3 and 4a, which lever is journalled on the shaft 90 and is provided at its lower end with a cam roller 126, which roller is engaged and operated by a cam 130 fixed to the operating shaft 62. A breakable connection is provided between said lever 124 and 118 so that both can be connected together for conjoint operation to effect the usual printing operation or can be disconnected so that the lever 124 can be operated without effecting a corresponding movement of the printing roll 46, whereby to permit the skipping of a stencil. The breakable connection includes a latch 132 which is fixed to a shaft 134 journalled in the upper end of the lever 124. Said latch is provided with a projection 136 which is normally received within a corresponding recess 138 formed in the cam lever 118. A spring 140 is connected between said latch 132 and platen arm 88 whereby to hold said latch in normal locking engagement with said cam arm 118. It is apparent that when said latch is depressed the cam lever 118 will be operatively disconnected from the lever 124 so that the operating shaft 62 can operate without actuating the printing roll.

Inasmuch as the breakable connections between the platen arm 88 and the roll-operating and cam lever 98 with their respective mechanisms are adapted to be broken and made conjointly, a common means is provided to operate said latches. Said means includes a pin 142 which is fixed in said latch 132 and extends into a slot 144 formed in said platen latch 104, said slot being desirable because of the differences in shapes of the operating cams 102 and 130 and the non-synchronous movements of the two mechanisms operated thereby. It is apparent that as said lever 132 is depressed the pin 142 will engage the bottom of the recess 144 to release the latch 104. Said latches are operated from a skip pedal 146, see Figs. 4a, 2 and 10, which pedal is journalled on the shaft 74 immediately to the left of the print pedal 72. Said skip pedal is provided with a rearwardly extended ear 148 to which a link 150 is pivotally connected. The upper end of said link is connected with an arm 154 fixed to the shaft 134 by means of a pin 156 which is extended loosely through an elongated slot 158 in the upper end of said link. As thus arranged, the depression of said skip pedal 146 serves to effect the rolls of the latches from their respective mechanisms. The slot 158 in said link 150 permits the normal movements of said mechanisms without corresponding movement of the skip pedal.

Figure 32:
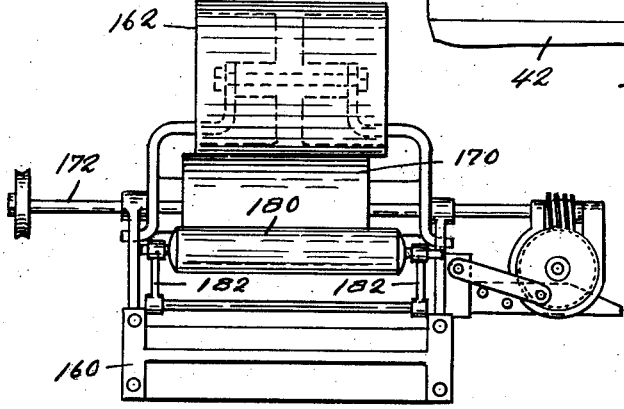
Fig. 32 is a front view of the inking unit.
Figure 33:
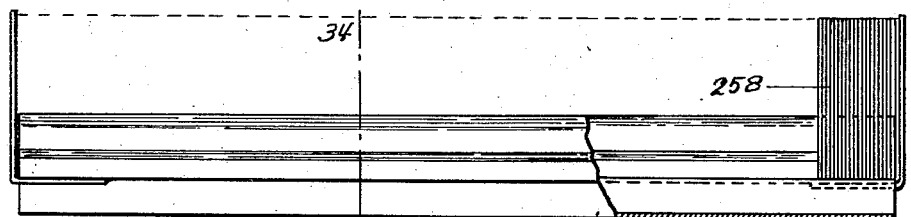
Fig. 33 is a side elevation partly broken away of a stencil holding tray especially constructed and arranged to transfer its stencil-content as a unit into the stencil holder and to receive the pile of stencils as a unit from the stencil receiver.

The printing roller 46 receives ink from an inking mechanism illustrated particularly in Figs. 3 and 32. Said mechanism includes a supporting bracket 160 which is secured to the under face of the table 42 and is provided with an inking roll 162 disposed beneath and in position to be engaged by said printing roll 46 in a low or inoperative position thereof. Said roll 162 is in rolling engagement with the transfer roll 170, the shaft 172 of which is continuously driven from the power mechanism 66 by belts 174 and 175 and the interposed countershaft 178. An ink-containing roller 180 is rotatably supported in a bracket 182 and is normally held free from engagement with said transfer roll 170 by means of the spring 184. Said ink roll is adapted to be lowered and moved momentarily into inking engagement with the transfer roll 170 for the purpose of replenishing the ink supply on said roll. To this end a rod 186 is pivotally connected with an arm 186 and extends forwardly under the table 42 and is terminated in a push knob 188 located at the front edge of the table, see also Fig. 2. When the printed addresses indicate the need for re-inking, the operative holds the knob 188 depressed momentarily.

As has previously been set forth, the stencils to be printed are contained in a stencil holder 48 preparatory to being withdrawn and moved into and out of printing position. The stencil holder 48, Figs. 11 through 15, includes a rectangular frame 190 which has an opening 192 therein adapted to be occupied by the lowermost stencils of the pile. Said frame is hingedly connected with the table 42 by means of a hinge-member 194 which is removably secured to the table by screws 196. Said frame 190 is provided with an ear 197, the edge of which is journalled on a pin 198 carried by said hinge-member. Said ear is provided with a projection 200 which is adapted to engage the hinge-member, see Fig. 13, whereby to support the holder in tilted position. The middle portion of the rear side-member of the frame 190 is elevated and has a passage 202 thereunder through which the fingers may be inserted to engage the stencils when desired. The stencil holder is adapted to be locked releasably in upright position to the table 48 by means of a pivoted latch 204, see Figs. 6 and 11, which latch is adapted to be swung into position above projecting ears 206 of said frame 190. The holder is provided with an upstanding stencil guide or channel having the parallel side walls 208 and the integral back wall 210, which wall is formed with a vertical groove 212 therein. A relatively thin and narrow upstanding plate 214 is secured to the frame 190 in front of the stencil opening between the side walls 208 and cooperates with said side and end walls to form an enclosure for the stencil therein received. The stencils in said holder are prevented from falling through the open bottom thereof by means of tabs 218 which are secured to the bottom face of said frame 190 and project under and overlie the opening therein. Said tabs are notched in their upper faces so that at least one stencil can lie thereon and be entirely clear of the lower face of said frame whereby it may be pushed laterally into the stencil track. The stencil track terminates at the left hand edge of the stencil holder and the lowermost stencil in the holder is adapted to be supported in line with the stencil grooves in the track when the holder is in the upright position.

A stencil weight 220 is loosely received in said holder above the pile of stencils therein and is provided with an outstanding ear 222 which is received in the slot 212 of the stencil holder thereby to center the weight in the holder. Said weight is provided with a pair of ribs 224 which are arranged in parallel relation at the opposite sides of the weight and serve to engage the stencils at opposite edges only, the body of the weight being free from contact with the stencil, thereby tending to straighten the stencils if they should be somewhat curved and to cause them to enter the stencil track more readily.

A stencil pusher or shuttle is disposed beneath the stencil holder and is reciprocable in the line of the stencil track to move the lowermost stencils successively from the stencil holder into and along the stencil track.

Said pusher includes a plate 226, see Figs. 1, 6, 8, 9, and 11, of approximately rectangular shape which is reciprocably disposed beneath the pile of stencils in the stencil holder and in line with the lowermost stencil in the pile and in position to be reciprocated into and out of the holder immediately above the tabs 218 of the stencil holder whereby to engage the lowermost stencil and move it out of the pile. Said plate 226 is provided with a forward stencil engaging edge 228 which is adapted to be moved against the edge of the stencil. Said edge 228 is relieved in the middle as indicated at 230 so that said edge engages the stencil only at the outer corners thereof. This arrangement is highly advantageous since it permits stencils which have become slightly warped to be straightened out or flattened as they are moved into the stencil track without the edge of the stencil catching on the edge of the pusher and tearing as has frequently been the case heretofore. The pusher is provided with a pair of ears 232 which project beneath the lowermost stencil and are arranged to guide the stencil into proper engagement with the pusher. The upper face of said pusher is provided with a plurality of raised sections 234 which are disposed behind the forward edge of the pusher and are provided with upwardly inclined faces 236. The function of said raised sections is to elevate the pile of stencils in the holder slightly above the lowermost stencil as the pusher is operated to move the lowermost stencil out of the pile, whereby to facilitate such movement and prevent the catching of the lowermost stencil with the next upper stencil.

The pusher is carried by a slider 238 which is reciprocable within a groove in the table 42 beneath the pusher and is held therein by a spacer block 240 and a plate 242 which overlies the bottom face of said table. Said slider 238 is formed with a T-shaped groove therein and the lower face of said pusher is formed with a corresponding T-shaped projection 244 which is received within said groove. Said pusher is secured detachably to said slider so that said slider can be reciprocated by its operating mechanism hereinafter to be described without a corresponding movement of the pusher for the purpose of permitting the line of stencils in the stencil track to be moved backwardly in order to return an inadvertently skipped stencil into printing position. To this end, the pusher is provided with an upstanding projection 246 at its extreme right hand end. A spring-pressed pin 248 is vertically movably received in said projection and is constantly urged downwardly by a spring 250. In its low position, the lower end of said pin is received within a recess in the slider 238, thereby locking the pusher and slider together for conjoint operation. The upper end of projection 246 is provided with a cam face 252 and said pin is provided with a cam member 254 which cooperates with said cam face. By rotating said pin 248 the cam member 254 is moved over the cam face 252 and is caused to elevate the pin and withdraw it from engagement with the slider, thereby disengaging the pusher and slider. The stencil holder can be tilted to raise it from its normal position and the line of stencils in the stencil track can then be pushed backward thereby to return a skipped stencil into printing position. The print pedal can then be depressed to effect the printing of the returned stencil. The pin 248 is constantly urged towards locking engagement with the slide 238 and the right hand edge of the slider is tapered at 256 as shown in Fig. 6 so that the pusher becomes automatically connected with the slider during the printing operation without further attention on the part of the operative.

The stencil 258 used in connection with this invention is illustrated in Fig. 35 and comprises an approximately square piece of relatively heavy cardboard formed with a window 260 therein which is occupied by a sheet of stencil paper 262 bearing the address 264. The window is disposed in the upper portion of the stencil and the lower portion of the stencil is provided with ledger lines 266 on which the data of the purchases or other account-information may be marked. Since the machine prints from below, the ledger is carried on the rear face of the stencil; and the ledger and the address are readable from opposite side edges of the stencils.

A stencil composed of cardboard or similar material sometimes becomes warped, sometimes along the length of the stencil and sometimes along the width of the stencil depending upon the type of stencil. In this invention, provision is made for straightening the warped stencil as it enters the stencil track, thereby to prevent delay and annoyance sometimes occasioned by the catching of warped stencils on the edge of the track and the consequent stopping of the feeding operations.

Figures 16, 34:
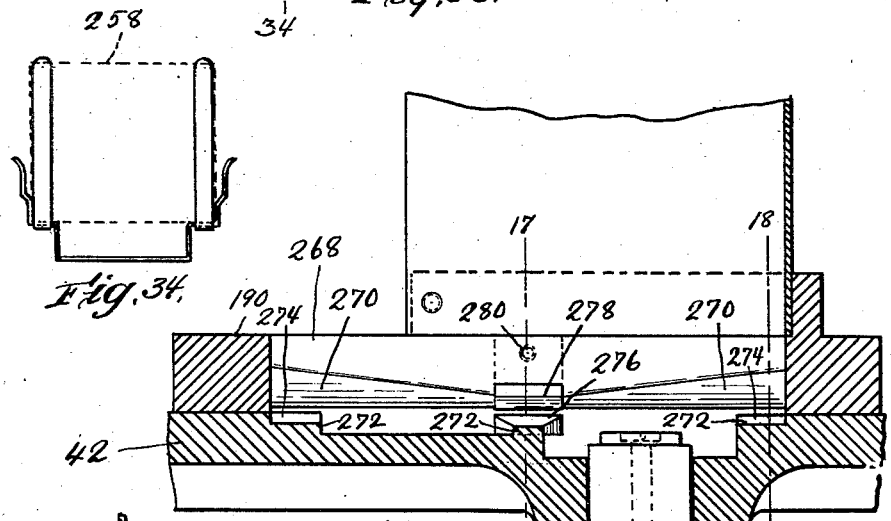
Fig. 16 is an enlarged sectional elevation taken along line 16—16 of Fig. 1 and illustrating most particularly the construction of the stencil holder and associated parts to straighten a bent stencil and guide it into the stencil track.
Fig. 34 is a transverse section along line 34—34 of Fig. 33.
Figure 17:
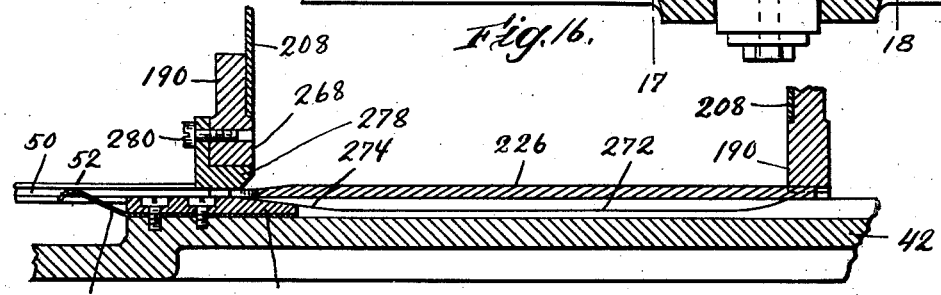
Fig. 17 is a section taken on line 17—17 of Fig. 16, the stencil pusher being at its extreme forward or delivery position.
Figure 18:
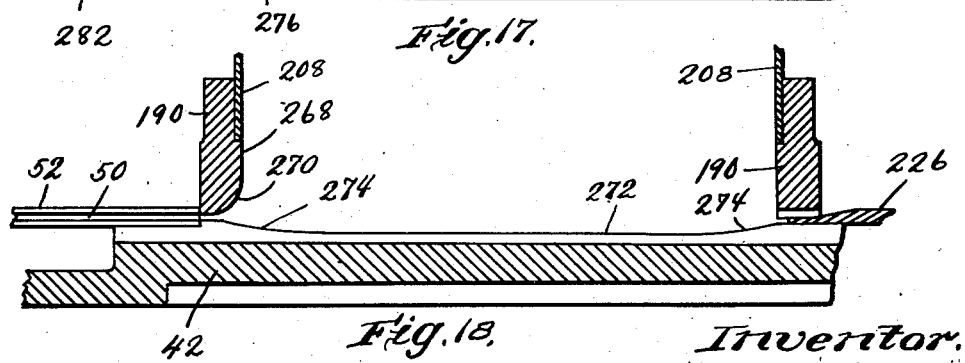
Fig. 18 is a section taken along line 18—18 of Fig. 16, the pusher being in its retracted position.

In accordance with this feature of the invention, the side 268 of the frame 190 of the stencil holder nearest the printing position, see Figs. 16, 17 and 18, is bevelled or is provided with a rounded or curved inner face 270 which is arranged to be engaged by the upstanding ends of a warped stencil and to cause said ends to be forced downwardly and thereby to straighten the stencil as it is pushed beneath said frame and into the stencil track.

The table 42 beneath the stencil holder is provided with three upstanding ribs 272, the forward edges 274 of which are inclined upwardly to guide the forward edge of the warped stencil into the entrance of the stencil track. A hardened steel wear-plate 276 is secured to the middle rib under the stencil holder immediately in front of the stencil track. The wall 268 of the stencil frame is also provided a wear-plate 278 which is removably secured to the frame above said first plate by one or more screws 280. Said wear-plates 276 and 278 may be machined to exact dimensions to provide a stencil outlet or orifice which can be aligned readily with the stencil track, the dimensions of which orifice can be accurately set.

A spring member 282 is secured between the wear-plate 276 and the table and is inclined upwardly to bear against the stencils in the track whereby to impart a slight frictional restraint on said stencils, thereby to prevent them from returning into the stencil holder when the pusher is withdrawn.

The operating mechanism for the stencil pusher includes a bell crank lever 284, see Figs. 2 and 6. Said bell crank lever is disposed beneath the table 42 and is pivoted on a stud shaft 286 carried by the table. Said bell crank lever has a short arm 288 which is provided with a spherical end 290, see Fig. 7, that is engaged by one end of a connecting rod 292. The other end of the connecting rod is pivotally connected by means including the pin 294 with an eccentric strap 296 which is carried by an eccentric 298 fixed to the shaft 62. By reason of said eccentric, the movements of the bell crank lever are decelerated uniformly and gradually at each end of the stroke so that the stencils are gradually brought to rest in the stencil track and are not impelled forwardly therein by their momentum after the pusher has been brought to rest as has sometimes been the case heretofore. By reason of the pivotal connection between the connecting rod 292 and the lever arm 288 at one end and the eccentric strap at the other end, a universal movement is permitted by which the bell crank lever can be operated without cramping.

Said bell crank lever is provided with a long arm 300 that is extended forwardly beneath the stencil track. The free end of said arm is pivotally connected with a connecting rod 302, see Figs. 6 and 10. Said connecting rod is extended beneath the pusher and its slider and is formed with an elongated slot 304 therein which at the extreme end is provided with an offset recess 306. The slider 238 is provided with a depending pin 308 which is received within said slot 304 and normally is retained in the offset recess 306 by a spring 310 which is connected with said connecting rod 302 and with the frame of the machine. As thus arranged, the reciprocation of the bell crank lever 284 effects the reciprocation of the slider and pusher.

For certain purposes, it is desirable to repeat the printing of the address borne by a selected stencil and for this purpose it is desirable to hold the stencil in printing position without moving it therefrom while the printing roll and platen are operated as many times as is desired. For this purpose, the pusher is arranged to be disengaged from its operating mechanism during one or more printing operations. To this end, said connecting rod 302 is adapted to be moved laterally to position the pin 308 in the slot 304 and to be held in displaced position while it is reciprocated so that it is not operatively connected with said pin 308. The connecting rod is displaced sidewise by means of a link 312 which is slidable in a bracket 314 fixed to and depending from the bottom face of the table. The rear end of said link is disposed in proximity with a lateral face of said connecting rod and normally is free from operative engagement therewith, and is adapted to be moved against said connecting rod whereby to displace said rod; and is adapted to be held in said position for so long as it is desired, thereby to maintain the connecting rod disengaged from the pusher. Said link is operated by means of a repeat pedal 316, which pedal is journalled on the shaft 74 in proximity to and at the right of the printing pedal 72. Said repeat pedal is provided with a rearwardly extended ear 318 which is pivotally connected with the lower end of an upwardly extended link 320, see Fig. 2. The upper end of said link is pivoted to the horizontal arm of a bell crank lever 322 which is journalled on a shaft 324 carried by a bracket 326 secured to the lower face of the table 42. The vertical arm of said bell crank lever is pivoted to said link 312. As thus arranged the depression of the repeat pedal effects the disconnection of the pusher from its operating mechanism.

The operation of either the skip or repeat pedals is adapted also to operate the mechanism associated with the print pedal through the depression of the print pedal so that but one foot is needed to control all of the operations of the machine. To this end, the foot rest 328 of the print pedal is adapted to overlie the foot rest extensions 330 of the skip and repeat pedals, the foot extension of the skip pedal being illustrated in Fig. 4a, so that the depression of either the skip or the repeat pedal also depresses the print pedal. The print pedal may also be operated without operating the repeat or skip mechanism.

As previously stated, the stencils are passed out of printing position and delivered into the stencil holder 54, although some may be removed from the line of stencils passing through the machine and discarded without being deposited in the stencil receiver. Said stencil receiver, see Figs. 19 through 22, comprises a pair of parallel and vertically-extended side plates 332 which are secured at their lower ends to a plate 334. Said side plates 332 are provided with inwardly reflexed sections 336 and are terminated in opposed and parallel edges 338, which edges form guideways for a stencil shield. An upstanding plate 340 is disposed intermediate said side plates 332 and cooperates therewith to form a wall of the receiver. Said plate 340 is secured at its lower end to the attaching plate 334. The stencil receiver is hingedly connected with the frame of the machine. To this end, said attaching plate 334 is provided with an outstanding ear 342 which is pivotally mounted on a pin 348 carried between ears of a hinged bracket 349, which bracket is fixed to the frame 40 of the machine. The upper ends of said side plates 332 are fixed to a U-shaped frame 345 which are adapted releasably to engage a fixed pin 346 depending from the lower face of and secured to the table 42 whereby to hold the stencil receiver releasably in vertical position in line with the stencil track so that the stencils may fall thereinto from said track. Said springs 344 are adapted to yield and permit the stencil receiver to be tilted about its pivotal support into a position wherein the pile of stencils contained therein can be withdrawn readily.

The stencils within said receiver are adapted to be supported upon a shelf or platform 351 which is vertically movable in said holder. Said shelf is fixed to the middle of a vertical rod 350 which rod has cross-bars 352 at its upper and lower ends. Said cross-bars are provided with aligned grooves in the ends thereof in which the edges 338 of said side plates 332 are received. This arrangement thus provides means to guide the stencil shelf for movement within the receiver. The stencil shelf is supported within the receiver by a pair of flexible cords 354. Said cords are connected with the opposite rear corners of the shelf and extend upwardly within the receiver and pass around through pulleys 356 carried by the frame 342 at the entrance to the receiver. Said cords are extended downwardly on the outside of the receiver and are secured to the ends of an equalizing bar 358. A tensile spring 360 is connected at one end with the middle of said bar and at the other end to the attaching plate 334 of the stencil receiver. Said spring is arranged to counterbalance the weight of the stencil shelf and the stencils thereon and to permit the shelf and the stencils to move downwardly in the receiver in proportion to the stencils that are received in the receiver, thereby to maintain the uppermost stencil always approximately in the same place.

Heretofore, the sides of the stencils have been in sliding engagement with the fixed side walls of the stencil receiver. The frictional engagement therebetween often has been so great as to restrict the downward movement and make it erratic and uncertain and consequently to limit the number of stencils that could be contained in the receiver for satisfactory operation. With the construction and arrangement of the stencil receiver herein described, the stencils are supported on the shelf in engagement with the flexible cords 354 and the shelf is inclined to insure such engagement so that the stencils are supported free from contact with the front and rear walls of the receiver. Consequently, the frictional contact between the stencil pile and the receiver is minimized so that the pile can descend gradually within the receiver and the receiver can receive a materially greater number of stencils than has heretofore been the case. Contact between the short sides of the stencils and the end walls of the receiver is largely prevented by so arranging the entrance to the receiver that the stencils fall therein and are lodged one upon the other free from engagement with the walls of the receiver.

Figure 24:
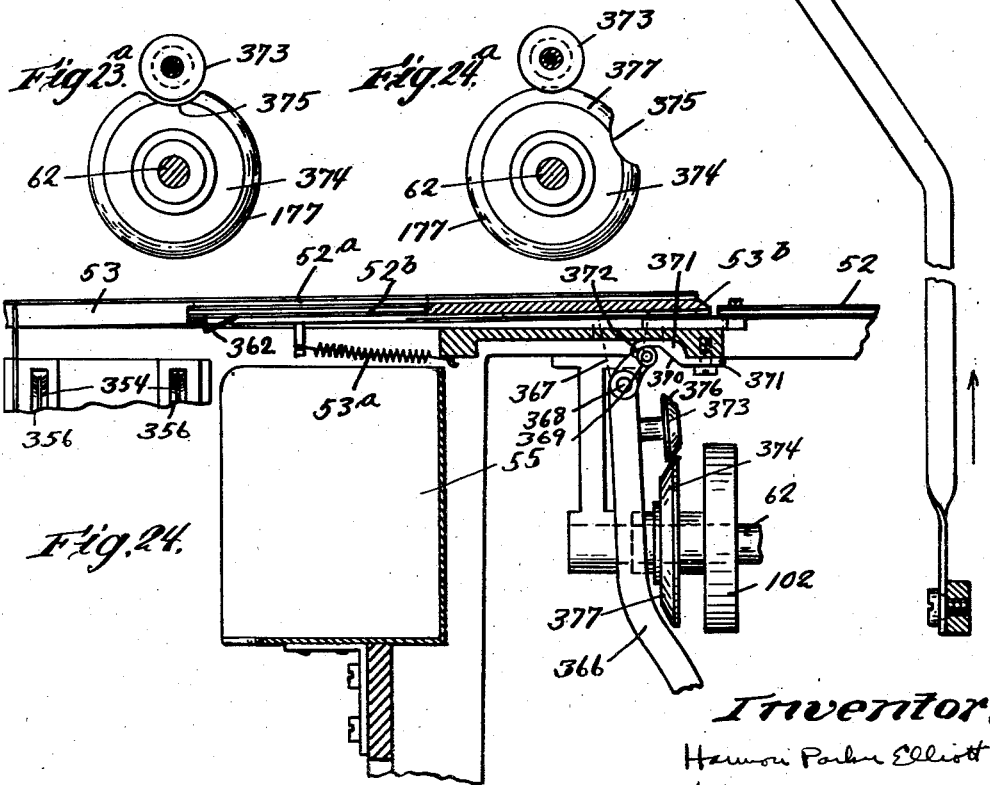
Fig. 24 is a view similar to Fig. 23 but illustrating the elevated position of the stencil track for the purging of an unwanted stencil.
Figure 25:
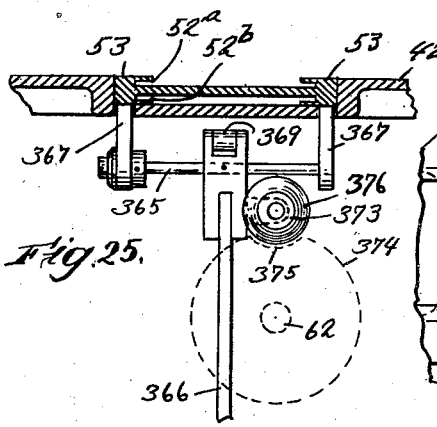
Fig. 25 is a transverse section of the purger track along line 25—25 of Fig. 1.
Figure 26:
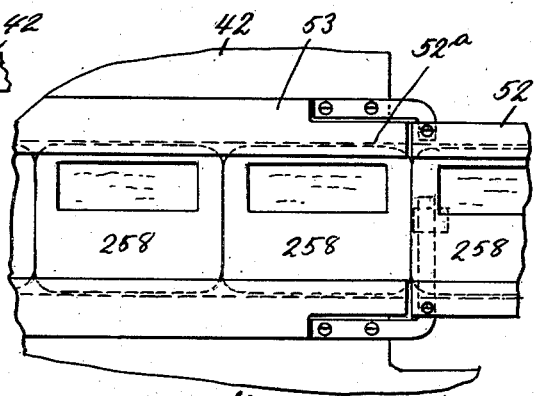
Fig. 26 is a plan detail of the fixed and movable portions of the stencil tracks in the normal position.
Figure 27:
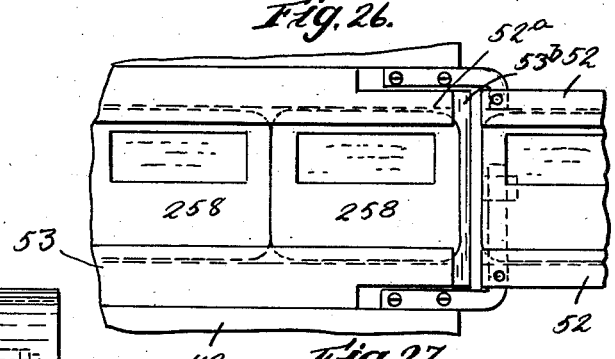
Fig. 27 is a view similar to Fig. 26 but with the purger-track in purging position and showing the longitudinal separation of the tracks.

As has been heretofore set forth, it is highly desirable to remove or "purge" the unwanted stencils at the time they are identified when in printing position, thus to bring the stencil collection up to date every time the collection is run off whereby to retain only active accounts in the collection and to avoid the long tedious separate operation heretofore common for this purpose. The purging device is illustrated in Fig. 1, and in detail in Figs. 23 through 27 inclusive and comprises essentially a means for switching or diverting the unwanted stencils away from the stencil receiver as they pass out of printing position. To this end, the stencil rails 52 are interrupted immediately at the left of the printing position to provide a vertically movable left-hand section 53 which is provided with upper grooves 52a which are extended to the stencil receiver and constitute the normal stencil track. A lower set of grooves 52b are formed in said sections through which the stencils pass when being purged. Under normal conditions said movable track-section 53 rests upon the table of the machine with the upper grooves 52a aligned with the stencil groove in the rails 52 so that the stencils can pass from printing position into the stencil receiver. When a stencil is to be removed from the line of stencils, however, the movable section is elevated at that end nearest the printing position so as to bring the lower set of grooves 52b into alignment with the grooves in the rails 52 as shown in Fig. 24. As thus arranged, a stencil disposed in printing position is moved into the lower set of grooves 52b and subsequently is discharged therefrom into a receptacle 55 disposed beneath the ends of the lower grooves 52b. A guide member 362 is disposed at the discharge end of said lower grooves in position to direct the discarded stencils to pass downwardly into said receptacle.

The operation of the purging device is effected by the depressing of a purge pedal 364, see Fig. 10, which is mounted on the supporting rod 74 in line with the other pedals and has a foot-rest 365 which is disposed beneath the foot rest 330 of the skip-pedal whereby to operate the skip-mechanism and, through the skip-pedal, the printing mechanism, thereby effecting automatically all of the necessary operations by the simple operation of the purge-pedal. An operating rod 366 is pivotally connected with said purge pedal and extends upwardly for connection with the purge-tracks 53. Said track has a pair of opposed depending arms 367 at its inner end in which a rod 368 is received, see Fig. 25, and said rod is passed through the upper end of said operating rod, whereby the raising of said rod serves to elevate the purge-tracks. Said rod is provided with a cam-roll 369 at its upper end which is adapted to engage the cam face 370 of a cam block 371 secured to the lower face of the table of the machine. Said cam face is inclined upwardly and toward the discharge end of the machine and is adapted to force the upper end of said rod and thereby the purge-track 53 towards the left and away from the fixed track 52 when the purge track is elevated. This arrangement permits the purge-track to clear the end of a stencil that may protrude from the end of the fixed track and thus prevents damage to the stencil and the possibility of jamming the machine. The cam block is provided with a depending projection or hook 372 that engages the cam-roll to limit the lateral movement of the purge-track. The lower forward portion 53b of the purge-track, at the entrance to the purge-grooves 52b, extends forwardly of the entrance to the upper grooves 52a so that the entrance to the purge-grooves will be disposed close to the grooves in the fixed track, when the purge-track is in elevated position, while the upper set of grooves has been moved to a relatively remote position for the purpose of clearing a protuberant stencil, as has been set forth above. The purge track descends to normal position by gravity and is moved laterally to normal relation with the fixed track by means including the spring 53a.

If the purge-mechanism were to be operated while the stencil-moving and other elements of the machine were in operation, and particularly when a stencil was in both the fixed and movable track-sections, that portion of the stencil in the purge-track would be moved upwardly, thereby to bend or break the stencil and hold the stencil from movement, thus jamming the machine. Consequently means are provided to lock the purge-mechanism out of operation except when conditions are such that it can be operated without damage. To this end, the operating rod 366 is provided with a locking roll 373 which is journalled on a projection thereof and normally is disposed behind a locking disc 374 fixed to the operating shaft 62 of the machine. Said disc has a notch 375 in its periphery which is disposed in line with the roll 373 in that position of the operating shaft corresponding to the end of a cycle of stencil feeding operations, at which time the stencils are motionless in the fixed section of the stencil track, thereby releasing the purge-mechanism for operation by permitting the roll to pass through the notch. The periphery of the locking disc is adapted to overlap the periphery of the roll in all other positions of the disc, however, thereby holding the roll from lateral movement except when the notch is in alignment with the roll. Both the roll and disc are provided with conical faces 376 and 377 respectively which are adapted to engage as illustrated in Figs. 24 and 24a after the purge-mechanism has been operated, whereby to prevent the resetting of the purge-mechanism until other elements of the machine have been operated.

The interconnection between the purge, skip and print pedals is such that the purge and skip mechanisms are set before the machine is set in operation, the purge pedal operating the skip and print pedals in successive order, thereby to avoid improper operation.

It is desirable at times to take a transcript of all the stencils in the stencil collection, or to print the addresses of the stencils on a long sheet or roll of paper, for the purpose of checking or verifying accounts, and means are provided to effect this result. Since a transcript of the addresses is desired only at relatively long intervals, the transcript mechanism is adapted as an attachment to be attached to the machine only when the transcript is desired. The transcript attachment is shown in place in Fig. 1 and is illustrated in detail in Figs. 28 through 31 inclusive. As here shown, the attachment comprises a bracket 382 which is secured removably by thumb screws 384 to the front edge of the table 42 in line with the platen and printing rail. Said bracket is provided with spaced arms 386 having slots 388 therein in which the shaft of a pressure roll 390 is rotatably received.

Said pressure roll is adapted to press a sheet of paper onto a set of driving rolls 392 which are disposed in slots in the table and project slightly above the top face thereof. Said rolls are fixed to a driving shaft 394 which is rotatably supported in suitable brackets 396 attached to the under side of the table. Said shaft and rolls are adapted to be permanently attached in position but are operated only when the transcript is desired.

Said rolls are provided with a driving mechanism that includes a connecting rod 398 which is pivotally connected to an arm 400 that reciprocates upon the shaft 394. Said arm carries a pawl 402 which is adapted to engage successive teeth of a rachet wheel 404 fixed to said shaft 394. The arrangement is such that as said connecting rod is reciprocated said rolls 392 are moved sufficiently to drive a sheet of paper a somewhat greater distance than the height of the address of the stencil. Said connecting rod is attached at its free end to the lever 98 that operates the platen, said rod having a slotted end 406 which loosely engages the roller-supporting pin 408 of said lever 98. When the transcript mechanism is not used said connecting rod 398 is adapted to be detached from said pin 308 and also from the pawl arm 400. A roller-supporting bracket 410 is secured to and depends beneath the aforesaid bracket 382. Said bracket 410 is provided with a horizontally directed stud shaft 412 on which a roll of paper 414 is rotatably supported. Said bracket is provided with an inwardly extended arm 416 in which a stud shaft 418 is fixed. A hub 420 is journalled on said shaft and is provided with a plate 422 which carries a plurality of sheet-supporting pins 424, one of which may be split. The end of the paper sheet is adapted to be entered in the slot in the split pin and wound upon all of said pins in the manner indicated in Fig. 28. Said hub 420 is provided with a grooved pulley 426 about which a coil-spring driving belt 428 is passed. Said belt is also passed about a grooved pulley 430 fixed to the counter-shaft 178, see Fig. 2, which pulley is continuously driven. The paper sheet is adapted to be driven by said driving rolls 392 and said belt is adapted to wind the paper when it is delivered from the driving rolls. Consequently, the belt is adapted to slide on its pulleys when the driving rolls are not feeding the paper. The transcript sheet is passed from the lower roll upwardly and over the stencil track in the printing position. A spreader comprising a wire loop 432 is carried by the bracket 382 and is extended from the stencil track to the rear thereof. The transcript sheet is passed about the rear edge of said loop and through a passage 434 in the platen and thence from the driving rollers to the winding device. The spreader loop serves to keep the transcript sheet taut immediately above the stencils, and the passage of the loop through the platen-passage 434 serves to maintain the freshly printed face of the transcript sheet free from contact with the platen arm. The spreader loop has its free ends loosely received in recesses in the arms of said bracket 382 and the loop can be detached from the bracket by springing the ends of the loop out of said recesses. When the transcript of the stencils has been completed, the transcript apparatus is adapted to be removed from the machine.

The construction may be otherwise modified without departing from the spirit of the invention.

I claim:

1. An addressing machine having a stencil track, a stencil holder, a pile of stencils contained in superimposed order in said holder, said stencils characterized by each having ledger data on one face thereof and an address which is inverted with respect to said ledger data, means to transfer successive stencils to said track and to move them along said track to a receiving position with the face bearing the ledger data uppermost, a platen disposed above said track, a printing roll disposed below said track and platen, means to support an address-receiving article in position under said platen and above said track, means to disable said printing roll and platen for the skipping of a selected stencil, and means under control of the machine-operative to divert the skipped stencil away from the receiving position.

2. An addressing machine having a table, a stencil track extended along the length and parallel with the front of said table, a stencil holder located at one end of said track and table, a printing roll and a platen disposed on opposite sides of said track, a plurality of stencil guides for delivering stencils from said printing roll and platen, means controllable by an operative for affecting the delivery of stencils from said roll and platen to a selected one of said guides, and means to cover that side portion of said track between said holder and said roll and platen, the stencils in said track being exposed between said roll and platen so as to be visible to the operative, said means constituting a support for the material to be addressed.

3. An addressing machine having a table, a stencil track extended along the length of said table, a stencil holder located at one end of said track, a printing roll and a platen disposed on opposite sides of said track, a plurality of stencil guides for delivering stencils from said printing roll and platen, means controllable by an operative for affecting the delivery of stencils from said roll and platen to a selected one of said guides, and means providing a removable cover for that side portion of said track between said holder and said roll and platen, the stencils in said track being exposed between said roll and platen, said means constituting a support for the material to be addressed.

4. An addressing machine having a table, formed with a groove therein extended in the direction of the length and parallel with the front of said table, a stencil track received in said groove beneath the top face of the table, means to feed stencils successively along said track, a platen disposed above said track and table and extended lengthwise thereof, a printing roll disposed beneath said table and track and extended lengthwise thereof, and a removable cover for that side portion of said track between said holder and said roll and platen, the stencils in said track being exposed between said roll and platen, and said cover being approximately flush with the top face of said table and constituting a support for the material to be addressed.

5. An addressing machine having a flat table, a platen disposed above the middle of the table and having a supporting arm which extends rearwardly over and beneath the table, a stencil holder carried by and extended above the table at one side thereof, and spaced a substantial distance from said platen to provide the table with a free work-supporting face between said holder and platen the top face of said table being otherwise free and unobstructed, and an inking roll and inking mechanism located beneath said table.

6. An addressing machine having a table, a stencil track extended across said table, a cooperating platen and printing roll disposed on opposite sides of said table, inking mechanism for said printing roll including an ink-roll normally free from cooperative elements of said inking mechanism, and a control member for said ink-roll disposed adjacent an edge of said table having means to move said ink roll into cooperative relation with said cooperative elements of said inking mechanism.

7. An addressing machine having a table, a stencil track extended across said table, a cooperating platen and printing roll disposed on opposite sides of said track, inking mechanism for said printing roll, including an ink-roll normally free from operative relation with cooperative elements of said inking mechanism, and means operable from an edge of said table to move said ink-roll into operative position.

8. An addressing machine having a table, a stencil track extended across said table, a platen disposed above said track, a printing roll disposed below said track and table, inking-mechanism for said printing roll disposed beneath said table and including an ink-roll normally free from operative relation with cooperative elements of said inking-mechanism, and a control-means for said ink-roll disposed beneath said table and including an operating-member located at the edge of and beneath said table and operable to move said ink-roll into operative position.

9. An addressing machine having a stencil track, a platen and a printing roll disposed on opposite sides of said track, an operating shaft disposed immediately beneath said track and characterized by being adapted for rotation in one direction only, cams carried by said shaft, and pivoted platen and roll-operating levers disposed immediately beneath said track and having bearings on and operated by said cams.

10. An addressing machine having a stencil track, a platen and a printing roll disposed on opposite sides of said track, an operating cam-shaft adapted for rotation in one direction only disposed immediately below said track, continuously-rotatable power mechanism including a start and stop mechanism having a rotating driving connection with said shaft, and pivoted platen and roll-operating levers disposed beneath said table and having bearings on and operated directly by the cams of said cam-shaft.

11. In an addressing machine, a stencil track, a platen and a printing roll disposed on opposite sides of said track, pivoted levers carrying said platen and roll and having cam-followers on the free ends thereof, an operating shaft, start and stop mechanism for said shaft, and cams carried by said shaft arranged directly to engage said cam followers and thus to reciprocate said levers.

12. In an addressing machine, the combination of a stencil track, a platen, a printing roll disposed on opposite sides of said track, actuating mechanism for said platen and roll, and separate operating mechanisms connecting said actuating mechanism independently with said platen and roll, said actuating mechanisms having breakable connections between cooperating elements thereof whereby to disable said platen and roll.

13. In an addressing machine, a reciprocable printing element, a pivoted lever carrying said element, a cam lever arranged to actuate said pivoted lever, a cam engageable with said cam lever for operating it, and a breakable connection between said levers.

14. In an addressing machine, a reciprocable printing element, a pivoted lever carrying said element, a cam lever concentrically pivoted with and arranged to actuate said pivoted lever, and a breakable connection between said levers including a latch pivoted on one lever and having a releasable connection with said other lever.

15. In an addressing machine, a reciprocable printing element, a pivoted lever carrying said element, a reciprocable cam lever pivoted co-axially with said first lever, a latch pivoted to said cam lever and having a releasable connection with said other lever, and means including a cam member cooperating with said cam lever to reciprocate it.

16. An addressing machine including a printing roll, a printing platen, pivoted levers carrying said roll and platen separately, pivoted operating levers for said first named levers, breakable connections releasably connecting said levers, and manually operable means controlling said breakable connections.

17. In an addressing machine, a reciprocable platen and printing roll, pivoted levers carrying said platen and roll, independent actuating means for the aforesaid levers, and independent breakable connections connecting said actuating and said pivoted levers.

18. In an addressing machine, a reciprocable platen and printing roll, pivoted levers carrying said platen and roll, independent actuating means for the aforesaid levers, independent breakable connections connecting said actuating and said pivoted levers, and manually operable control means for said breakable connections common to both of them.

19. In an addressing machine, a reciprocable platen and printing roll, pivoted levers carrying said platen and roll, a cam lever associated with each pivoted lever, actuating mechanism for said cam levers including a driving cam for each lever, breakable connections releasably connecting each cam lever with its cooperating pivoted lever, and common control means for both breakable connections carried by one of said breakable connections.

20. In an addressing machine, a reciprocable platen and printing roll, pivoted levers carrying said platen and roll, a cam lever associated with each pivoted lever, actuating mechanism for said cam levers including a driving cam for each lever, breakable connections releasably connecting each cam lever with its cooperating pivoted lever, and common control for both breakable connections carried by one of said breakable connections and having a lost motion connection therewith.

21. An addressing machine having the combination of pivoted platen and printing roll, operating levers, actuating levers for said pivoted levers, latches releasably connecting said actuating and pivoted levers, and means connecting said latches for conjoint operation.

22. An addressing machine having the combination of pivoted platen and printing roll operating-levers, actuating levers for said pivoted levers, latches releasably connecting said actuating and pivoted levers, and means including a lost motion connection between said latches arranged to effect their conjoint operation.

23. In an addressing machine, a printing roll, a horizontal pivoted lever carrying said roll, a vertical operating lever pivoted at its upper end therefor having an upper cam face engageable with said roll lever, a vertical actuating lever for said operating lever and a rotatable cam disposed beside and engageable with the lower free end of said cam lever for reciprocating it.

24. An addressing machine having means to move a row of stencils step by step in one direction into and out of a printing position, means to print from selected stencils only and permit others to pass through the printing position without printing therefrom, and means admitting of the return of a stencil in the opposite direction into printing position after it has been moved outwardly therefrom.

25. An addressing machine having means to feed a row of stencils successively into and out of printing position, said stencils being visible to an operative when in said printing position and also when they have been moved out of said position, means to print from selected stencils only and permit others to pass through the printing position without printing therefrom, means under the control of the operative whereby the operative can push a stencil which has been moved out of printing position back into printing position, and means to effect the printing of such returned stencil including means to disable said stencil feeding means.

26. An addressing machine having the combination of a plurality of stencils, means to move said stencils in a line successively and normally in one direction into and out of printing position, printing mechanism located at said printing position, means to operate said printing mechanism to print from selected stencils and to permit others to move through the printing position without printing therefrom, and means under control of an operative admitting of the return to printing position of a stencil which has been moved out of said position, said means including means to disable said stencil moving means and effect the operation of said printing mechanism.

27. An addressing machine including a cooperating platen and printing roll, a stencil track extended between said platen and roll, a pusher to move a plurality of stencils in successive order and normally in one direction only along said track and into printing position between said platen and roll and thence in the same direction out of said printing position, and means admitting of the reverse movement of the line of stencils in said track by the direct action of the operative on one of the stencils in the track including means to free said pusher so that it can move reversely by the reverse movement of the line of stencils.

28. An addressing machine having a stencil track, means to move stencils successively along said track into and thence out of said printing position, operating means for said moving means, and means under control of an operative permitting the movement of the stencils in the reverse direction in said track, said means including means to disengage said stencil moving means from said operating means and thereby free said moving means for reverse movement under the action of the stencils in said track.

29. An addressing machine having a track, a reciprocable pusher operable to move stencils forwardly along said track into and out of printing position, operating mechanism for said pusher, and means admitting of the movement of said stencils backwardly along said track, said means including means to disengage said pusher from said operating mechanism, said pusher thereupon being free for movement independently of said operating mechanism.

30. An addressing machine having a track, a reciprocable pusher operable to move stencils forwardly along said track into and out of printing position, operating mechanism for said pusher, and means admitting of the movement of said stencils backwardly along said track, said means including means to disengage said pusher from said operating mechanism, said pusher thereupon being free for independent movement, and automatically operative means to reconnect said pusher with said operating mechanism.

31. In an addressing machine, the combination of a holder adapted to contain a pile of stencils, a stencil track cooperating with said holder, a reciprocable pusher operable to move the lowermost stencils of said pile successively into said track, a reciprocable slider carrying said pusher, and operating means to reciprocate said slider, said pusher having manually-operable releasable connection with said slider so that said slider can reciprocate independently of said pusher.

32. In an addressing machine, the combination of a holder adapted to contain a pile of stencils, a stencil track cooperating with said holder, a reciprocable pusher operable to move the lowermost stencils of said pile successively into said track, a reciprocable slider carrying said pusher, and operating means to reciprocate said slider, said pusher having a manually-releasable and automatically-connectable driving connection with said slider.

33. In an addressing machine, the combination of a holder adapted to contain a pile of stencils, a stencil track cooperating with said holder, a reciprocable pusher operable to move the lowermost stencils of said pile successively into said track, a reciprocable slider carrying said pusher, and operating means to reciprocate said slider, said pusher having a spring-pressed pin normally locking said pusher and slider together and manually-actuated cam-governed means to remove said pin from its locking engagement with said slider.

34. In a stencil printing machine, the combination of a stencil pusher, a reciprocable slider adapted normally to drive said pusher, and means admitting of the independent movement of said pusher and slider including a breakable connection between the two.

35. In a stencil printing machine, the combination of a stencil pusher, a reciprocable slider adapted normally to drive said pusher, and means admitting of the independent movement of said pusher including a manually-breakable and automatically connectible connection between said pusher and slider.

36. In a stencil printing machine, the combination of a reciprocable slider, a stencil pusher carried by and having a sliding connection with said slider, and means releasably to lock said pusher and slider together.

37. In a stencil printing machine, the combination of a reciprocable slider, a stencil pusher having a sliding connection with said slider admitting of movement of said pusher on said slider along the line of movement thereof, and a releasable locking connection between said slider and pusher.

38. In a stencil printing machine, the combination of a reciprocable slider having a groove extended in the direction of movement of said slider, a stencil pusher carried by and having a tongue slidable in the groove in said slider, and a releasable locking connection between said pusher and slider.

39. An addressing machine having means to move stencils successively into and out of a printing position and thereafter to a receiving position, means to print from the stencils when they are in printing position, means to obtain multiple prints from a selected stencil while it is in printing position, means operable when the stencils are in printing position to skip the printing of a selected stencil, and means under control of the machine-operative to divert the skipped stencil away from the receiving position.

40. An addressing machine including a collection of stencils, means to move stencils successively from said collection in a line into and out of printing position, means to print from said stencils when in printing position, and means to obtain multiple prints from a selected stencil when it is in printing position including means to arrest the movement of said line of stencils, each stencil being visible to the operative when in printing position and said stencil arresting means being under the control of the operative, whereby the operative may decide at the time a stencil is in printing position whether or not multiple imprints are to be made from the stencil.

41. An addressing machine including a collection of stencils, means to feed stencils from said collection successively into and out of printing position and to hold each stencil motionless momentarily while it is in printing position, printing mechanism operable on the stationary stencil, and means under the control of the operative to effect repeated operations of said printing mechanism while a selected stencil is maintained stationary in printing position during and between such repeated printing operations.

42. An addressing machine having the combination of a collection of stencils, each stencil characterized by having an address at one portion thereof and ledger data at another portion thereof, means to feed stencils from said collection into and out of printing position and to hold the stencils momentarily stationary in said printing position with the ledger data visible to an operative without stopping the operation of the machine, printing mechanism operable upon the stationary stencils in said printing position to print the addresses borne thereby, and means under the control of the operative to effect repeated operations of said printed mechanism upon a particular stencil selected with reference to the ledger data thereon.

43. In a stencil printing machine a reciprocable stencil pusher, operating means therefor including a member having a breakable connection with said pusher and biased for constant connection therewith, and means to break said connection.

44. In a stencil printing machine, a reciprocable stencil pusher, operating means therefor including a member having a breakable connection with said pusher, means constantly urging said member to maintain its connection with said pusher, and manual means to actuate said member to break said connection.

45. An addressing machine having the combination of a stencil track, printing mechanism having cooperating elements disposed on opposite sides of said track, means including a reciprocable stencil pusher arranged to move stencils successively along said track into and out of position between said cooperating element, operating mechanism for said stencil pusher including a member having a breakable connection with said pusher, means constantly urging said member to maintain its operative connection with said pusher, and means under control of an operative to actuate said member against said urging means and in a direction to break said connection.

46. In a stencil printing machine the combination of reciprocable stencil pusher, a guideway in which said pusher is slidable, operating mechanism for said pusher including a connecting rod having a slot therein provided with an offset recess, a projection carried by said pusher received in said slot means urging said connecting rod in a direction to maintain said projection in the offset recess, and means to move said connecting rod against the action of said urging means in a direction to position said projection in said slot, whereby said connecting rod can reciprocate free from operative connection with said projection.

47. A stencil printing machine having the combination of a reciprocable pusher, operating mechanism therefor including a reciprocable connecting rod having a slot therein extended along the length of said rod and an offset recess located at one end of said slot, said pusher having a projection normally received in said offset recess whereby said pusher is in driving engagement with said connecting rod, and means to break up such driving engagement including a stationarily-supported member disposed adjacent said connecting rod and movable into engagement therewith and to move said connecting rod laterally in a direction to dispose said projection within said slot in said connecting rod, whereby to permit the reciprocatory movement of said connecting rod independently of said pusher.

48. In a stencil printing machine, the combination of a reciprocable pusher, and operating mechanism therefor including a pivoted lever having an operable connection with said pusher, a rotatable operating shaft, an eccentric fixed to said shaft, and a connecting rod operated by said eccentric and having a universal connection with said lever.

49. In a stencil printing machine, the combination of a reciprocable pusher, and operating mechanism therefor including a pivoted lever having an operable connection with said pusher, a rotatable operating shaft, an eccentric fixed to said shaft, an eccentric strap surrounding said eccentric, and a connecting rod having pivotal connections in transverse planes with said eccentric strap and said pivoted lever.

50. An addressing machine having a stencil holder, a stencil track cooperating therewith, means to move stencils successively from said holder into and along said track including a pusher and operating mechanism therefor, and means permitting a movement of the stencils in the reverse direction in said track including means to move the stencil holder out of cooperative relation with said track, and means to disconnect said pusher from said operating mechanism.

51. An addressing machine having a stencil holder, a stencil track cooperating therewith, a pusher to move stencils successively from said holder into and along said track, operating mechanism therefor, a breakable connection between said pusher and operating mechanism by which said pusher can move independently of said operating mechanism, said connection being automatically restored by the operation of said operating mechanism, and means to move said stencil holder out of cooperative relation with said track.

52. In an addressing machine, a stencil holder adapted to contain a pile of superimposed stencils, said holder having side walls and a plurality of tabs disposed at the bottom of and fixed to said side walls and extended into the stencil space of the holder to engage the lowermost stencil and support the pile therein, said tabs having recessed upper faces adapted to receive the lowermost stencil of the pile and support it below at least one of said side walls, whereby to provide for the lateral movement of a stencil over said tabs and out of the holder.

53. In an addressing machine, a stencil holder adapted to contain a pile of superimposed stencils, said holder having superposed upper and lower walls defining a long and narrow stencil-straightening discharge slot for the stencils located at the bottom and at the forward side thereof and having means disposed beneath and in the rear of said slot on which the pile of stencils is adapted to rest.

54. In an addressing machine, the combination of a frame, a stencil track carried by said frame, and a stencil holder normally disposed in cooperative relation with said track and adapted to contain a pile of superimposed stencils, said holder having means extending beneath the stencil space therein arranged to engage the lowermost stencil and support the pile of stencils in said holder, said holder also having superposed upper and lower walls defining a long and narrow stencil-straightening lateral discharge slot disposed above and in front of said stencil supporting means and arranged normally in register with the entrance to said stencil track.

55. In an addressing machine, the combination of a frame, a stencil track carried by said frame, a stencil holder normally disposed in cooperative relation with said track and adapted to contain a pile of superimposed stencils, said holder having means extending beneath the stencil space therein arranged to engage the lowermost stencil and support the pile of stencils in said holder, said holder also having upper and lower walls defining a long and narrow stencil straightening lateral discharge slot disposed above and in front of said stencil supporting means and arranged normally in register with the entrance to said stencil track and means movably connecting said stencil holder with said frame whereby to move said stencil holder into and out of cooperative relation with said track.

56. An addressing machine having the combination of a stencil track, a stencil holder disposed removably in cooperative relation with said track and having means carried by it to support a pile of superimposed stencils therein, and a stencil pusher reciprocable into and out of said holder in overlying relation with said supporting means to move the lowermost stencils successively into and along said track.

57. A stencil holder for a stencil printing machine, said holder adapted to contain a pile of superimposed stencils and having a platform disposed beneath the stencil space therein adapted to support the pile of stencils, and also having superposed upper and lower walls defining a long and narrow stencil-straightening lateral slot disposed above said platform and through which the lowermost stencils are adapted to be moved successively from said platform.

58. In an addressing machine, the combination of a stencil track, a stencil holder disposed in cooperative relation with said track and adapted to contain a pile of superimposed stencils, said stencil holder having fixed to it a platform disposed beneath the stencil space adapted to support the pile of stencils, said holder also having walls defining a long and narrow lateral stencil-straightening slot disposed above said platform in a position to straighten and to deliver the lowermost stencils successively into said track from said platform, and means pivotally supporting said stencil holder providing for movement thereof into and out of cooperative relation with said track.

59. An addressing machine having the combination of a stencil track, a stencil holder adapted to contain a pile of superimposed stencils, a stencil pusher operable to move the stencils from said holder successively into and along said track and into and out of printing position, and means under control of an operative provided for a reverse movement of said stencils in said track including supporting means for said stencil holder on which said holder is movable into and out of cooperative relation with said track, and operating mechanism for said pusher including a breakable connection between said pusher and mechanism.

60. In an addressing machine, a stencil track, a stencil holder cooperating therewith and adapted to contain a pile of superimposed stencils, means to move stencils successively from said holder to and along said track, and means interposed between said track and the stencil pile to straighten a bent stencil prior to its complete delivery to said track.

61. In an addressing machine, a stencil track, a stencil holder cooperating therewith and adapted to contain a pile of superimposed stencils and means to move stencils successively from said holder to and along said track, said stencil holder having means to straighten a bent stencil during its movement from the holder.

62. In a stencil printing machine, a holder adapted to contain a pile of superimposed stencils, said holder having a wall formed with a passage therein through which the stencils are discharged and the face of said wall within said holder being curved towards said discharge passage in a manner to straighten a bent stencil as it passes through said passage.

63. In an addressing machine, a stencil holder adapted to contain a pile of superimposed stencils, said holder having a discharge slot for the stencils which has approximately the cross-sectional dimensions of the stencils, said holder also having means to straighten a curved stencil and to guide it into said slot.

64. In a stencil printing machine, a collection of stencils, means to pass said stencils in a successive order into and out of a printing position and means operated at the will of an operative to remove stencils selected by the operative from the collection after they have been in the printing position.

65. In an addressing machine, a collection of stencils, a stencil receiver adapted to receive used stencils, means to pass the stencils in successive order into and out of printing position and thence normally into said receiver and means operated at the will of an operative to divert stencils selected by the operative away from said receiver.

66. In an addressing machine, a stencil holder adapted to contain a pile of superimposed stencils, a stencil receiver in which used stencils are adapted to be deposited, printing mechanism, means to pass the stencils in successive order from said holder into and out of a printing position and thence to said receiver and means under control of an operative to withhold the delivery into said receiver of stencils selected by the operative and to skip the printing of such stencils.

67. An addressing machine having stencil feeding mechanism, printing mechanism, means to skip a stencil selected by the operative and means under control of the operative to remove the skipped stencil from the stencil collection.

68. A stencil printing machine having a collection of stencils, means to pass all stencils toward a printing position and means to print from some stencils, and means to remove other stencils from the collection without printing therefrom.

69. A stencil printing machine having a collection of stencils, means to pass all stencils toward a printing position, means to print from some stencils and means to remove other stencils from the collection without printing therefrom, said last named means being under control of an operative.

70. A stencil printing machine having the combination of a stencil track, a stencil receiver located at one end of said track, means to move stencils successively along said track into and out of printing position and thence toward said receiver and means under control of an operative to effect the delivery of certain stencils into said receiver and to divert away from said receiver stencils selected by the operative.

71. A stencil printing machine having printing mechanism, means to feed a collection of stencils in successive order through said printing mechanism, and means to disable said printing mechanism and to remove selected stencils from the collection without printing therefrom.

72. In a stencil printing machine, stencil moving means, a stencil track along which successive stencils are moved, printing mechanism located in cooperative relation with said track, said track having two branches, means to condition the machine for the delivery of stencils from said printing mechanism into a selected one of said branches and means which withholds the operation of the aforesaid means except when the stencils are at rest.

73. In a stencil printing machine, a stencil track in which stencils are moved successively, said track consisting of a main portion and two branch portions, and means to move either one of said branch portions into register with said main portion to receive stencils from said main portion.

74. In a stencil printing machine, a stencil track along which stencils are moved successively, said track having a pair of normally-registering sections and means to move one of said sections into and out of register with said other section.

75. In a stencil printing machine, a stencil track along which stencil track stencils are passed, said track having two sections, and means to raise and lower one of said sections in a vertical direction out of and into register with said other section.

76. In a stencil printing machine, a stencil track along which stencils are adapted to be passed successively, said track consisting of a fixed main portion and two superposed and connected movable branch portions, and means to move said branch portions in a vertical direction to bring one or the other of said branch portions into register with the fixed portion of said track.

77. In a stencil printing machine, a stencil track having a fixed section and a movable section, and means to raise and lower said movable section and also to move it laterally toward and away from said fixed section.

78. In a stencil printing machine, a stencil track having a fixed portion and two movable superposed and connected branch portions, and means to raise and lower said branch portions and also to move them laterally.

79. An addressing machine having a stencil track, a stencil holder located at one end of said track, a stencil receiver located at the other end of said track, means to move stencils in successive order from said holder along said track to said stencil receiver, printing mechanism operable upon the stencils in said track, and means to divert selected stencils away from said stencil receiver and to disable said printing mechanism.

80. An addressing machine having a table, a stencil track extended therealong, a stencil holder located at one end of said track, a stencil receiver located at the other end of said track, means to move stencils in successive order from said holder along said track to said stencil receiver, printing mechanism operable upon the stencils in said track, means to divert selected stencils away from said stencil receiver, and control means for said diverting means for the control of said printing mechanism.

81. A stencil printing machine having the combination of stencil moving mechanism, stencil printing mechanism, stencil purging mechanism, and a control member for said purging mechanism also having provision for control of said printing mechanism.

82. A stencil printing machine having the combination of stencil moving mechanism, stencil printing mechanism, mechanism to disable said printing mechanism to effect the skipping of a stencil without printing therefrom, stencil purging mechanism, and a control member for said purging mechanism also having provision for control of said skipping mechanism.

83. A stencil printing machine having the combination of stencil moving mechanism, stencil printing mechanism, stencil-skipping mechanism, stencil purging mechanism, and a control member having provision for the conjoint control of said printing, skipping and purging mechanisms.

84. A stencil printing machine having the combination of stencil moving mechanism, stencil printing mechanism, stencil-skipping mechanism, stencil purging mechanism, and a control member having provision for the successive control of said purging, skipping and printing mechanisms in the order named.

85. A stencil printing machine having the combination of elements operative on the stencil including stencil moving means, stencil-purging mechanism, and an interlock between said purging mechanism and said elements arranged normally to lock said purging mechanism out of effective operation except when said stencil moving means is inactive.

86. A stencil printing machine having stencil moving means, stencil-purging mechanism and means normally locking said mechanism in an unoperated position except when the stencils are at rest.

87. A stencil printing machine having stencil-purging mechanism and means normally locking said mechanism both in and out of operative position.

88. A stencil printing machine having cooperating components operating in repeated cycles, stencil-purging mechanism, means normally locking said mechanism in an unoperated position, and automatically-operative means associated with said cooperating components to release the lock on said mechanism at a predetermined part of each cycle.

89. A stencil printing machine having stencil-moving means, stencil-purging means, means normally locking said purging means in an unoperated position, and means associated with said stencil-moving means operable to release the lock on said mechanism when said stencil moving means is inactive.

90. A stencil printing machine having stencil-moving means, stencil-purging means, and an interlock between the aforesaid means normally holding said purging means from effective operation during active periods of said stencil moving means.

91. A stencil printing machine having a rotatable operating shaft, stencil-printing mechanism operable independently of said shaft, and locking means for said purging mechanism having an interlocking connection with said shaft.

92. A stencil printing machine having a rotatable operating shaft, stencil-purging mechanism operable independently of said shaft, and locking means for said purging mechanism controlled by said shaft characterized by having means for holding said purging mechanism locked in both operated and unoperated positions thereof.

93. A stencil printing machine having a rotatable operating shaft, stencil-purging mechanism operable independently of said shaft including a member movable axially of said shaft, and a disc fixed to said shaft arranged in the path of movement of said member to engage and hold it against effective movement in opposite directions, said disc having a notch therein adapted to be moved into alignment with said member in a predetermined angular setting of said shaft and through which notch said member is free to pass, whereby to effect operation of said purging mechanism.

94. An addressing machine having the combination of a stencil feeding mechanism, printing mechanism, means to effect the skipping of a selected stencil, means to effect the repeated printing of a selected stencil, means to control the printing operation, skip, repeat and print pedals respectively controlling the aforesaid means, and means interconnecting said skip and repeat pedals with said print pedal whereby the operation of said print and skip pedal and also of said repeat pedal operates said print pedal, said print pedal being free to operate independently of said other pedals.

95. The combination of a collection of stencils carrying account-information, and a stencil printing machine having means to move the stencils in successive order into and out of a printing position and thence to a receiving position, said machine having provision for the exposure of the account-information of the stencils, when they are in printing position, printing means operable on the stencils at the printing position, and means under the control of the machine-operative and arranged to be operated by him when the stencils are in printing position and in accordance with his interpretation of the exposed account-information of the stencils to effect the delivery of some stencils to the receiving position and the discharge of other stencils away from the receiving position and out of the stencil collection.

96. The combination of a collection of stencils bearing addresses and account-information, and a printing machine therefor having means to move the stencils in successive order into and out of a printing position and thence normally to a receiving position, printing means operable on the stencils at the printing position, the account-information of the stencils being visible to and interpretable by an operative when the stencils are in printing position, and means under control of the machine-operative and arranged to be operated by him when the stencils are in printing position and in accordance with his interpretation of the account-information of the stencils to effect the delivery of some stencils to the receiving position and the discharge of other stencils away from printing position and out of the stencil collection.

97. A stencil printing machine having a printing station, and two stencil receiving stations, printing mechanism adapted to operate on successive stencils held stationary and capable of being inspected by an operative in said printing station, and means under control of the operative and arranged to be operated by him when the stencils are in said printing station to effect the delivery of selected stencils to either one of said receiving stations.

98. A stencil printing machine having an inspecting station in which the stencils are held stationary for inspection by an operative, two receiving stations, means to move successive stencils into and out of said inspecting station and into a position to pass to either one of said receiving stations, printing mechanism operable on the successive stencils, and means controllable by an operative in a manner determined by his inspection of a stencil when in said inspecting station to effect the movement of said stencil to a selected one of said two receiving stations.

99. A stencil printing machine having printing mechanism, a plurality of stencil guides for conducting stencils from said printing mechanism, and means controllable by an operative for conditioning a selected one of said guides for cooperative relation with said printing mechanism.

100. A stencil printing machine having printing mechanism, a plurality of stencil guides for delivering stencils from said printing mechanism, and means controllable by an operative for affecting the delivery of stencils from said printing mechanism to a selected one of said guides.

101. An addressing machine having the combination of a stencil track, a stencil holder disposed normally in cooperative relation with said track, supporting means for the stencil arranged to permit it to move into and out of said cooperative relation, said holder having projections at the bottom thereof which engage and support the lowermost stencil therein, and a stencil pusher having means guiding it for horizontal movement into and out of the bottom of said holder in confronting relation with said projections to move the lowermost stencil out of said holder and into said track, said pusher when within said holder being engaged by said projections to hold said holder against movement out of cooperative relation with said track.

In testimony whereof, I have signed my name to this specification.

HARMON PARKER ELLIOTT.